(12) United States Patent
Nishiguchi et al.

(10) Patent No.: US 9,309,451 B2
(45) Date of Patent: Apr. 12, 2016

(54) AZEOTROPIC MIXTURE-LIKE COMPOSITION, HEAT TRANSFER COMPOSITION, CLEANER, HIGH-TEMPERATURE HEAT PUMP DEVICE, AND HEAT TRANSFER METHOD

(71) Applicant: CENTRAL GLASS COMPANY, LIMITED, Ube, Yamaguchi (JP)

(72) Inventors: Yoshio Nishiguchi, Kawagoe (JP);
Satoru Okamoto, Kawagoe (JP);
Masatomi Kanai, Kawagoe (JP);
Takuya Tonomura, Kawagoe (JP)

(73) Assignee: CENTRAL GLASS COMPANY, LIMITED, Ube (JP)

( * ) Notice: Subject to any disclaimer, the term of this patent is extended or adjusted under 35 U.S.C. 154(b) by 0 days.

(21) Appl. No.: 14/582,420

(22) Filed: Dec. 24, 2014

(65) Prior Publication Data

US 2015/0184049 A1    Jul. 2, 2015

(30) Foreign Application Priority Data

Dec. 26, 2013  (JP) ................................. 2013-270450

(51) Int. Cl.
| | | |
|---|---|---|
| C09K 5/04 | (2006.01) | |
| C11D 1/66 | (2006.01) | |
| C11D 3/43 | (2006.01) | |
| F25B 30/02 | (2006.01) | |

(52) U.S. Cl.
CPC . *C09K 5/045* (2013.01); *C11D 1/66* (2013.01); *C11D 3/43* (2013.01); *F25B 30/02* (2013.01); *C09K 2205/102* (2013.01); *C09K 2205/112* (2013.01); *C09K 2205/22* (2013.01); *C09K 2205/32* (2013.01)

(58) Field of Classification Search
CPC ............ C09K 5/04; C09K 5/045; C11D 3/43; C11D 1/66; F25B 30/02
USPC ....................... 252/67, 68, 69; 62/56, 118, 498
See application file for complete search history.

(56) References Cited

U.S. PATENT DOCUMENTS

| | | | | |
|---|---|---|---|---|
| 3,346,448 | A * | 10/1967 | Gilbert et al. .................. | 514/722 |
| 3,883,665 | A * | 5/1975 | Croix ............................ | 514/722 |
| 3,911,024 | A * | 10/1975 | Croix ............................ | 568/683 |
| 6,448,451 | B1 * | 9/2002 | Rudzinski et al. ............. | 568/682 |
| 2004/0147779 | A1 * | 7/2004 | Rozov et al. ................... | 562/851 |
| 2008/0214875 | A1 * | 9/2008 | Jones et al. .................... | 568/682 |
| 2009/0008599 | A1 | 1/2009 | Fukushima | |
| 2010/0004155 | A1 | 1/2010 | Ishihara | |
| 2010/0312019 | A1 * | 12/2010 | Kovalenko et al. ............ | 568/683 |
| 2015/0122461 | A1 * | 5/2015 | Nishiguchi et al. ........ | 165/104.21 |

FOREIGN PATENT DOCUMENTS

| | | |
|---|---|---|
| EP | 1900801 A1 | 3/2008 |
| JP | H10-324897 A | 12/1998 |
| JP | 2005-23259 A | 1/2005 |
| JP | 2008-133438 A | 6/2008 |
| JP | 2013-249326 A | 12/2013 |
| WO | 2007/105724 A1 | 9/2007 |
| WO | 2013/157302 A1 | 10/2013 |

OTHER PUBLICATIONS

Extended Search Report dated May 15, 2015 regarding a corresponding European Patent Application No. 14004353.0.

* cited by examiner

*Primary Examiner* — Douglas McGinty
(74) *Attorney, Agent, or Firm* — Typha IP LLC

(57) ABSTRACT

An azeotropic mixture-like composition containing 1,1,1,3,3,3-hexafluoroisopropylmethylether (HFE-356mmz) and hexafluoroisopropanol (HFIP) is provided. 1,1,1,3,3,3-hexafluoroisopropylmethylether may be contained at a ratio higher than or equal to 0.1% by mass and lower than or equal to 99.9% by mass.

16 Claims, 8 Drawing Sheets

AZEOTROPIC MIXTURE-LIKE COMPOSITION, HEAT TRANSFER COMPOSITION, CLEANER, HIGH-TEMPERATURE HEAT PUMP DEVICE, AND HEAT TRANSFER METHOD

CROSS REFERENCE TO RELATED APPLICATIONS

This application is based upon and claims the benefit of priority from the prior Japanese Patent Application No. 2013-270450, filed on Dec. 26, 2013, the entire contents of which are incorporated herein by reference.

FIELD

The present invention relates to an azeotropic mixture-like composition containing 1,1,1,3,3,3-hexafluoroisopropylmethylether and hexafluoroisopropanol that is useful in many applications. The present invention also relates to a cleaner containing such an azeotropic mixture-like composition. The present invention further relates to a heat transfer composition containing such an azeotropic mixture-like composition, and a high-temperature heat pump device and a heat transfer method using the same.

BACKGROUND

Conventionally, chlorofluorocarbons (CFCs) and hydrochlorofluorocarbons (HCFCs) are widely used as coolants, foaming agents, solvents, cleaners, heat transfer mediums, working fluids, reaction solvents, solvents for paints, extractants, dewatering agents, drying agents and the like. However, these materials contain chlorine and are targets of concern as materials that cause depletion of ozone layer. In order to solve such a problem, alternative compounds for CFCs and HCFCs that do not cause depletion of ozone layer even when being released into the atmosphere are desired.

As such alternative compounds, many materials including hydrocarbons (HCs), hydrofluorocarbons (HFCs), hydrofluoroethers (HFEs) and the like have been proposed.

HCs are proposed for a wide range of applications mainly including coolants, foaming agents, solvents, cleaners, heat transfer mediums, working fluids, reaction solvents, solvents for paints, extractants, dewatering agents, drying agents and the like. HC-based materials are advantageous in not exerting much influence on global warming, depletion of ozone layer in the stratosphere or the like. However, most of HC-based materials are flammable and cause concerns regarding safety.

HFCs, which do not contain chlorine atoms, iodine atoms, bromine atoms or any other atoms that cause depletion of ozone layer, do not influence the ozone layer almost at all. However, most of HFCs, which are non-flammable, have a long atmospheric life time and cause concerns regarding influence on global warming.

HFEs, which do not contain chlorine atoms, iodine atoms, bromine atoms or any other atoms that cause depletion of ozone layer, do not influence the ozone layer almost at all. In addition, according to an estimation, HFEs, which contain a plurality of hydrogen atoms, have a relatively high reactivity with an OH radical in the atmosphere and thus have a short atmospheric life time. Therefore, HFEs do not cause much influence on global warming. However, when HFE is used independently, the required performance may not be exerted sufficiently.

In many cases where a plurality of HFEs are mixed (Japanese Laid-Open Patent Publication No. 2005-23259) and in many cases where HFE is mixed with a compound such as alcohol or the like (Japanese Laid-Open Patent Publication No. 2008-133438, Japanese Laid-Open Patent Publication No. Hei 10-324897), properties required of an alternative for CFC, HCFC or the like, namely, compatibility with polyol, coolant characteristics, cleaning characteristics, surface tension, heat conductivity of gas and the like are improved.

However, it is known that when such a mixture is a non-azeotropic-mixture-like composition, the concentration thereof needs to be controlled because the mixture ratio thereof in the form of a vapor and the mixture ratio thereof in the form of a liquid are different from each other. In the case where, for example, the non-azeotropic-mixture-like composition is used for a cleaner and the cleaner is evaporated during cleaning, the mixture ratio of the cleaner is changed and thus a stable operation cannot be easily performed. In the case where the non-azeotropic-mixture-like composition is used for a coolant also, the mixture ratio is changed when the coolant leaks, which lowers the heat pump performance.

By contrast, when such a mixture is an azeotropic mixture-like composition, the concentration thereof does not need to be controlled because the mixture ratio thereof in the form of a vapor and the mixture ratio thereof in the form of a liquid are substantially the same as each other. Therefore, the above-described problems do not occur. However, such a mixture does not always contain an azeotropic mixture-like composition. Whether there is such an azeotropic mixture-like composition or not cannot be estimated.

SUMMARY

The present invention has an object of providing an azeotropic mixture-like composition that acts as an alternative for CFC, HCFC or the like and is useful in a wide range of applications including coolants, solvents, cleaners and the like. The present invention has an object of providing an azeotropic mixture-like composition, a heat transfer composition and a cleaner each acting as an alternative for CFC, HCFC or the like, and a high-temperature heat pump device and a heat transfer method using the heat transfer composition.

As a result of active studies, the present inventors found that a composition containing 1,1,1,3,3,3-hexafluoroisopropylmethylether and hexafluoroisopropanol exhibits an azeotropic mixture-like phenomenon of having substantially the same mixture ratio in a vapor phase portion and a liquid phase portion, and thus achieved the present invention.

Hereinafter, the present invention will be described in detail. The term "azeotropic mixture-like" indicates that a composition behaves like an azeotropic mixture, namely, that a vapor that is formed while a liquid is being boiled or evaporated has the same or substantially the same mixture ratio as that of the liquid. In the case of an azeotropic mixture-like composition, the mixture ratio of the liquid, if changed, is changed by a minimum or ignorable degree while the liquid is being boiled or evaporated. This is quite different from a non-azeotropic mixture-like composition, in which the mixture ratio of a liquid is significantly changed while the liquid is being boiled or evaporated.

The present invention is as follows.

[Invention 1]

An azeotropic mixture-like composition containing 1,1,1,3,3,3-hexafluoroisopropylmethylether and hexafluoroisopropanol.

[Invention 2]

The azeotropic mixture-like composition according to invention 1, wherein 1,1,1,3,3,3-hexafluoroisopropylmethylether is contained at a ratio higher than or equal to 0.1% by mass and lower than or equal to 99.9% by mass.

[Invention 3]

The azeotropic mixture-like composition according to invention 1, wherein 1,1,1,3,3,3-hexafluoroisopropylmethylether is contained at a ratio higher than or equal to 33.0% by mass and lower than or equal to 99.9% by mass.

[Invention 4]

The azeotropic mixture-like composition according to invention 1, wherein 1,1,1,3,3,3-hexafluoroisopropylmethylether is contained at a ratio higher than or equal to 90% by mass and lower than or equal to 99.9% by mass.

[Invention 5]

An azeotropic mixture-like heat transfer composition containing 1,1,1,3,3,3-hexafluoroisopropylmethylether and hexafluoroisopropanol.

[Invention 6]

The heat transfer composition according to invention 5, wherein 1,1,1,3,3,3-hexafluoroisopropylmethylether is contained at a ratio higher than or equal to 33.0% by mass and lower than or equal to 99.9% by mass.

[Invention 7]

The heat transfer composition according to invention 5, wherein 1,1,1,3,3,3-hexafluoroisopropylmethylether is contained at a ratio higher than or equal to 90% by mass and lower than or equal to 99.9% by mass.

[Invention 8]

The heat transfer composition according to any one of inventions 5 through 7, further comprising a lubricant.

[Invention 9]

The heat transfer composition according to invention 8, wherein the lubricant is selected from mineral oil (paraffin-based oil or naphthene-based oil), any of alkylbenzenes (ABs), poly(alpha-olefin), esters, polyolesters (POEs), polyalkyleneglycols (PAGs), and polyvinylethers (PVEs), which are each synthetic oil, and a combination thereof.

[Invention 10]

The heat transfer composition according to any one of inventions 5 through 9, further comprising a stabilizer.

[Invention 11]

The heat transfer composition according to invention 10, wherein the stabilizer is selected from nitro compounds, epoxy compounds, phenols, imidazoles, amines, diene-based compounds, phosphates, aromatic unsaturated hydrocarbons, isoprenes, propadienes, terpenes, and a combination thereof.

[Invention 12]

The heat transfer composition according to any one of inventions 5 through 11, further comprising a flame retardant.

[Invention 13]

The heat transfer composition according to invention 12, wherein the flame retardant is selected from phosphates, halogenated aromatic compounds, fluorinated iodocarbon, fluorinated bromocarbon, and a combination thereof.

[Invention 14]

A cleaner containing the composition according to any one of inventions 1 through 4.

[Invention 15]

The cleaner according to any one of inventions 1 through 4, further comprising a non-ionic surfactant at a ratio higher than or equal to 0.1% by mass and lower than or equal to 20% by mass.

[Invention 16]

A heat transfer method using a high-temperature heat pump device that accommodates a heat transfer composition, the method comprising the steps, performed sequentially, of evaporating the heat transfer composition; compressing the heat transfer composition; condensing the heat transfer composition; and reducing the pressure of the heat transfer composition. The heat transfer composition contains 1,1,1,3,3,3-hexafluoroisopropylmethylether and hexafluoroisopropanol, and has a condensation temperature higher than or equal to 70° C.

[Invention 17]

The heat transfer method according to invention 16, wherein the heat transfer composition contains 1,1,1,3,3,3-hexafluoroisopropylmethylether at a ratio higher than or equal to 33.0% by mass and lower than or equal to 99.9% by mass.

[Invention 18]

The heat transfer method according to invention 16, wherein the heat transfer composition contains 1,1,1,3,3,3-hexafluoroisopropylmethylether at a ratio higher than or equal to 90% by mass and lower than or equal to 99.9% by mass.

[Invention 19]

The heat transfer method according to any one of inventions 16 through 18, wherein the heat transfer composition comprises a lubricant.

[Invention 20]

The heat transfer method according to invention 19, wherein the lubricant is selected from mineral oil (paraffin-based oil or naphthene-based oil), any of alkylbenzenes (ABs), poly(alpha-olefin), esters, polyolesters (POEs), polyalkyleneglycols (PAGs), and polyvinylethers (PVEs), which are each synthetic oil, and a combination thereof.

[Invention 21]

The heat transfer method according to any one of inventions 16 through 20, wherein the heat transfer composition further comprises a stabilizer.

[Invention 22]

The heat transfer method according to invention 21, wherein the stabilizer is selected from nitro compounds, epoxy compounds, phenols, imidazoles, amines, diene-based compounds, phosphates, aromatic unsaturated hydrocarbons, isoprenes, propadienes, terpenes, and a combination thereof.

[Invention 23]

The heat transfer method according to any one of inventions 16 through 22, wherein the heat transfer composition further comprises a flame retardant.

[Invention 24]

The heat transfer method according to invention 23, wherein the flame retardant is selected from phosphates, halogenated aromatic compounds, fluorinated iodocarbon, fluorinated bromocarbon, and a combination thereof.

[Invention 25]

The heat transfer method according to any one of inventions 16 through 24, wherein warm water, pressurized warm water or superheated vapor having a temperature higher than or equal to 60° C. is generated.

[Invention 26]

The heat transfer method according to any one of inventions 16 through 24, wherein hot water, pressurized hot water or superheated vapor having a temperature higher than or equal to 80° C. is generated.

[Invention 27]

The heat transfer method according to any one of inventions 16 through 24, wherein pressurized hot water or superheated vapor having a temperature higher than or equal to 110° C. is generated.

[Invention 28]

A high-temperature heat pump device using the heat transfer method according to any one of inventions 16 through 27.

REFERENCE SIGNS LIST

Figure 1:
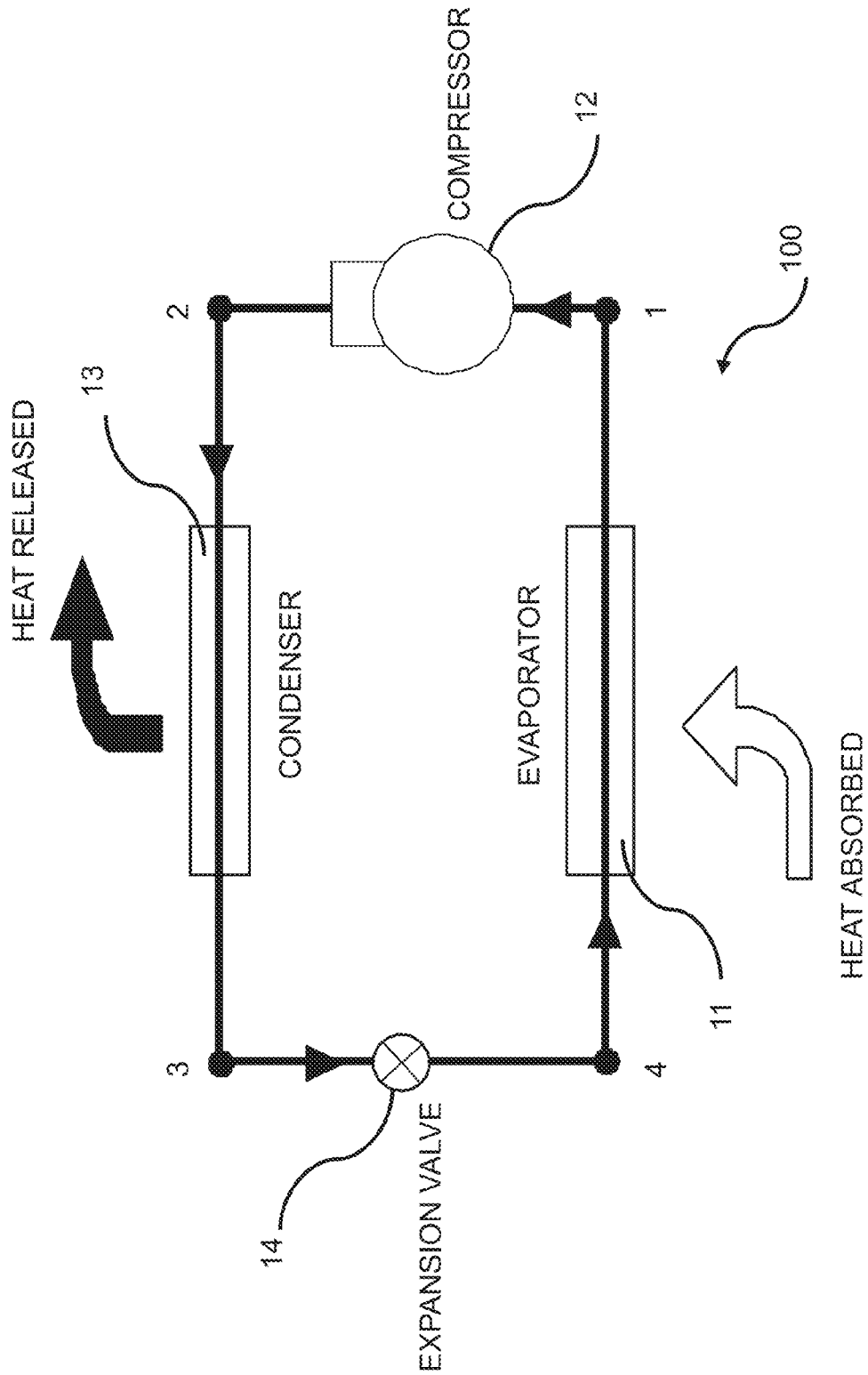
FIG. 1 is a schematic view of a high-temperature heat pump cycle to which an azeotropic mixture-like composition according to the present invention is applicable.

11: evaporator; 12: compressor; 13: condenser; 14: expansion valve; 100: high-temperature heat pump device

DESCRIPTION OF EMBODIMENTS

Hereinafter, an azeotropic mixture-like composition, a heat transfer composition, a cleaner, a high-temperature heat pump device and a heat transfer method according to the present invention will be described with reference to the drawings. The azeotropic mixture-like composition, the heat transfer composition, the cleaner, the high-temperature heat pump device and the heat transfer method according to the present invention are not to be construed as being limited to the embodiments or examples described below. In the figures referred to in the embodiments and the examples, the same elements or elements having substantially the same functions will bear the same reference signs and the descriptions thereof will not be repeated.

An azeotropic mixture-like composition according to the present invention is a mixture of 1,1,1,3,3,3-hexafluoroisopropylmethylether and hexafluoroisopropanol. The present inventors found that the azeotropic mixture-like composition according to the present invention, because of being such a mixture, is non-flammable or low flammable, has little environmental load, and is usable for a heat transfer composition, a solvent, a cleaner or the like as an alternative for CFC, HCFC or the like. The present inventors also found that a heat transfer composition containing the azeotropic mixture-like composition according to the present invention, because of containing such a mixture, is non-flammable or low flammable, has little environmental load, and has high thermal cycle characteristics and high heat transfer characteristics.

1,1,1,3,3,3-hexafluoroisopropylmethylether (HFE-356mmz) will be described.

<HFE-356mmz>

HFE-356mmz is highly reactive with a hydroxy group radical and therefore has a very low global warming potential (GWP) and little environmental load. HFE-356mmz is low flammable or flame-resistant. HFE-356mmz has a boiling point of 50.9° C. at an atmospheric pressure, an atmospheric life time of 0.25 years, and a global warming potential (GWP) of 27 (Industrial & Engineering Chemistry Research 2012, Vol. 51, pp. 12537-12548).

Hexafluoroisopropanol (HFIP; 1,1,1,3,3,3-hexafluoro-2-propanol) will be described.

<HFIP>

HFIP is highly reactive with a hydroxy group radical and therefore has a very low global warming potential (GWP) and little environmental load. HFIP is non-flammable. HFIP has a boiling point of 58.6° C. at an atmospheric pressure, an atmospheric life time of 1.9 years, and a global warming potential (GWP) of 210 (Industrial & Engineering Chemistry Research 2012, Vol. 51, pp. 12537-12548).

The azeotropic mixture-like composition according to the present invention is a composition containing 1,1,1,3,3,3-hexafluoroisopropylmethylether and hexafluoroisopropanol. 1,1,1,3,3,3-hexafluoroisopropylmethylether is contained at a ratio higher than or equal to 0.1% by mass and lower than or equal to 99.9% by mass.

The global warming potential (GWP) of the hexafluoroisopropanol is higher than that of HFE-356mmz. Therefore, hexafluoroisopropanol is contained preferably at a ratio higher than or equal to 0.1% by mass and lower than or equal to 67.0% by mass, and especially preferably at a ratio higher than or equal to 0.1% by mass and lower than or equal to 10% by mass.

In one embodiment, the azeotropic mixture-like composition according to the present invention contains 1,1,1,3,3,3-hexafluoroisopropylmethylether at a ratio higher than or equal to 33.0% by mass and lower than or equal to 99.9% by mass, and contains hexafluoroisopropanol at a ratio higher than or equal to 0.1% by mass and lower than or equal to 67.0% by mass. Because of such a mixture ratio, the azeotropic mixture-like composition has a global warming potential that is less than 150.

1,1,1,3,3,3-hexafluoroisopropylmethylether and hexafluoroisopropanol have critical temperatures close to each other, and therefore, the mixture ratio thereof has little influence on the critical temperature of the heat transfer composition according to the present invention containing these materials.

The azeotropic mixture-like composition according to the present invention may be prepared as follows. 1,1,1,3,3,3-hexafluoroisopropylmethylether and hexafluoroisopropanol may be produced separately, and may be mixed together at the above-described mixture ratio. Alternatively, a mixture containing 1,1,1,3,3,3-hexafluoroisopropylmethylether and hexafluoroisopropanol at any mixture ratio may be mixed with one of these materials such that the above-described mixture ratio is realized. Still alternatively, a composition containing both of the materials may be distilled.

<Heat Transfer Composition>

In the case where the azeotropic mixture-like composition according to the present invention is used for a heat transfer composition, hexafluoroisopropanol is desirably contained at a ratio higher than or equal to 0.1% by mass and lower than or equal to 33% by mass, and especially desirably contained at a ratio higher than or equal to 0.1% by mass and lower than or equal to 10% by mass. Because of such a mixture ratio, the heat transfer composition has a global warming potential that is less than 150.

The heat transfer composition according to the present invention may include a lubricant, a stabilizer, or a flame retardant when necessary in addition to 1,1,1,3,3,3-hexafluoroisopropylmethylether and hexafluoroisopropanol.

<Lubricant>

In the case where the heat transfer composition according to the present invention is used for a coolant of a high-temperature heat pump, the lubricant used in a slide unit of a compressor may be mineral oil (paraffin-based oil or naphthene-based oil) or any of alkylbenzenes (ABs), poly(alpha-olefin), esters, polyesters (POEs), polyalkyleneglycols (PAGs), and polyvinylethers (PVEs), which are each synthetic oil.

In the case where the heat transfer composition according to the present invention is used for a working medium of a rankine cycle, the lubricant used in a slide unit of an expansion device may be mineral oil (paraffin-based oil or naphthene-based oil) or any of alkylbenzenes (ABs), poly(alpha-olefin), esters, polyesters (POEs), polyalkyleneglycols (PAGs), and polyvinylethers (PVEs), which are each synthetic oil.

The alkylbenzenes include, for example, n-octylbenzene, n-nonylbenzene, n-decylbenzene, n-undecylbenzene, n-dodecylbenzene, n-tridecylbenzene, 2-methyl-1-phenylheptane, 2-methyl-1-phenyloctane, 2-methyl-1-phenylnonane, 2-methyl-1-phenyldecane, 2-methyl-1-phenylundecane, 2-methyl-1-phenyldodecane, 2-methyl-1-phenyltridecane, and the like.

The esters include, for example, aromatic esters such as benzoic acid, phthalic acid, isophthalic acid, terephthalic acid, trimellitic acid, pyromellitic acid, a mixture thereof and the like; dibasic acid ester; polyolester; complex ester; carbonate ester; and the like.

Examples of alcohol usable as a material of the polyolesters include esters of hindered alcohol such as neopentylglycol, trimethylolethane, trimethylolpropane, trimethylolbutane, di-(trimethylolpropane), tri-(trimethylolpropane), pentaerythritol, di-(pentaerythritol), tri-(pentaerythritol), and the like.

Examples of carboxylic acid usable as a material of the polyolesters include valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, 3,5,5-trimethylhexanoic acid, and the like.

The polyalkyleneglycols include, for example, compounds obtained by addition-polymerizing ethylene oxide, propylene oxide, butylene oxide or the like to an aliphatic alcohol having a carbon number larger than or equal to 1 and smaller than or equal to 18, such as methanol, ethanol, linear or branched propanol, linear or branched butanol, linear or branched pentanol, linear or branched hexanol or the like.

The polyvinylethers include, for example, polymethylvinylether, polyethylvinylether, poly-n-propylvinylether, polyisopropylvinylether, and the like.

<Stabilizer>

The heat transfer composition according to the present invention may contain a stabilizer in order to improve the thermal stability, the oxidation resistance and the like. Examples of the stabilizer include nitro compounds, epoxy compounds, phenols, imidazoles, amines, phosphates, hydrocarbons and the like.

The nitro compounds may be known compounds, for example, aliphatic and/or aromatic derivatives. The aliphatic nitro compounds include, for example, nitromethane, nitroethane, 1-nitropropane, 2-nitropropane, and the like. The aromatic nitro compounds include, for example, nitrobenzene, o-, m- or p-dinitrobenzene, trinitrobenzene, o-, m- or p-nitrotoluene, o-, m- or p-ethylnitrobenzene, 2,3-, 2,4-, 2,5-, 2,6-, 3,4- or 3,5-dimethylnitrobenzene, o-, m- or p-nitroacetophenone, o-, m- or p-nitrophenol, o-, m- or p-nitroanisole, and the like.

The epoxy compounds include, for example, monoepoxy-based compounds such as ethyleneoxide, 1,2-butyleneoxide, propyleneoxide, styreneoxide, cyclohexeneoxide, glycidol, epichlorhydrin, glycidylmethacrylate, phenylglycidylether, allylglycidylether, methylglycidylether, butylglycidylether, 2-ethylhexylglycidylether, and the like; polyepoxy-based compounds such as diepoxybutane, vinylcyclohexenedioxide, neopentylglycoldiglycidylether, ethyleneglycoldiglycidylether, glycerinepolyglycidylether, trimethylolpropanetriglycidylether, and the like; etc.

The phenols may contain any of various substituents such as an alkyl group, an alkenyl group, an alkoxy group, a carboxyl group, a carbonyl group, a halogen and the like as well as a hydroxy group. Such phenols include, for example, primary phenols such as 2,6-di-t-butyl-p-cresol, o-cresol, m-cresol, p-cresol, thymol, p-t-butylphenol, o-methoxyphenol, m-methoxyphenol, p-methoxyphenol, eugenol, isoeugenol, buthyhydroxyanisole, phenol, xylenol, and the like; secondary phenols such as t-butylcatechol, 2,5-di-t-aminohydroquinone, 2,5-di-t-butylhydroquinone, and the like; etc.

The imidazoles may be compounds containing, as a substituent at the N position, a linear or branched alkyl group having a carbon number larger than or equal to 1 and smaller than or equal to 18, a cycloalkyl group or a aryl group; for example, 1-methylimidazole, 1-n-butylimidazole, 1-phenylimidazole, 1-benzylimidazole, 1-(β-oxyethyl)imidazole, 1-methyl-2-propylimidazole, 1-methyl-2-isobutylimidazole, 1-n-butyl-2-methylimidazole, 1,2-dimethylimidazole, 1,4-dimethylimidazole, 1,5-dimethylimidazole, 1,2,5-trimethylimidazole, 1,4,5-trimethylimidazole, 1-ethyl-2-methylimidazole, and the like. These compounds may be used independently or in a combination of two or more.

The amines include, for example, pentylamine, hexylamine, diisopropylamine, diisobutylamine, di-n-propylamine, diallylamine, triethylamine, N-methylaniline, pyridine, morpholine, N-methylmorpholine, triallylamine, allylamine, α-methylbenzylamine, methylamine, dimethylamine, trimethylamine, ethylamine, diethylamine, propylamine, isopropylamine, dipropylamine, butylamine, isobutylamine, dibutylamine, tributylamine, dibenzylamine, tribenzylamine, 2-ethylhexylamine, aniline, N,N-dimethylaniline, N,N-diethylaniline, ethylenediamine, propylenediamine, diethylenetriamine, tetraethylenepentamine, benzylamine, dibenzylamine, diphenylamine, diethylhydroxylamine, and the like. These may be used independently or in a combination of two or more.

The hydrocarbons include, for example, diene-based compounds, aromatic unsaturated hydrocarbons such as α-methylstyrene, p-isopropenyltoluene, and the like, isoprenes, propadienes, terpenes, and the like. These may be used independently or in a combination of two or more.

The stabilizer may be incorporated into one of, or both of, a coolant and a lubricant in advance, or may be put into a condenser independently. There is no specific limitation on the amount of the stabilizer. The content of the stabilizer with respect to the main coolant (100% by mass) is preferably higher than or equal to 0.001% by mass and lower than or equal to 10% by mass, more preferably higher than or equal to 0.01% by mass and lower than or equal to 5% by mass, and still more preferably higher than or equal to 0.02% by mass and lower than or equal to 2% by mass. When the amount of the stabilizer exceeds the upper limit or less than the lower limit, the stability of the coolant, the thermal cycle characteristics and the like cannot be sufficient.

<Flame Retardant>

The heat transfer composition according to the present invention may contain a flame retardant in order to suppress the combustibility. Examples of the flame retardant include phosphates, halogenated aromatic compounds, fluorinated iodocarbon, fluorinated bromocarbon, and the like.

The heat transfer composition according to the present invention containing such compounds has a condensation temperature higher than or equal to 70° C. and lower than or equal to 140° C., preferably higher than or equal to 80° C. and lower than or equal to 140° C., and more preferably higher than or equal to 90° C. and lower than or equal to 140° C.

The condensation pressure of the heat transfer composition according to the present invention containing such compounds is determined by the mixture ratio and the condensation temperature of the heat transfer composition. Namely, the condensation pressure is equal to the saturated vapor pressure of the heat transfer composition at the condensation temperature. In general, when the condensation pressure exceeds 5.0 MPa, a compressor, a condenser and piping components that have a high pressure resistance and thus are costly are required, which is not preferable. In the case where the heat transfer composition according to the present invention is used, the condensation pressure can be lower than 5.0 MPa, and thus a compressor, a condenser, and piping components that are known are usable.

The heat transfer composition according to the present invention is non-flammable, has little environmental load and has high thermal cycle characteristics. Therefore, the heat transfer composition according to the present invention is usable for a heating medium usable in a high-temperature heat pump used for, for example, generating pressurized warm water or superheated vapor; a working medium for an organic rankine cycle usable for an electric power generation system or the like; a coolant for a vapor-compressive freezing cycle system; and a medium of a suction heat pump, a heat pipe or the like.

A heat transfer method according to the present invention is applicable to a package-type compact device (rankine cycle system, heat pump cycle system, etc.) and also a large-scale, namely, a plant-scale electric power generation system, a heat-pump hot water supply system, a heat-pump vapor generation system, and the like.

Hereinafter, a high-temperature heat pump device using the heat transfer composition according to the present invention will be described.

<High-Temperature Heat Pump Device>

A high-temperature heat pump device is a system that operates as follows. An evaporator transfers heat of a substance to be cooled such as air, water, brine or the like to a coolant as evaporated latent heat of a coolant. The compressor compresses the generated coolant vapor by adding a work thereto. A condenser discharges the condensation heat to liquefy the coolant. An expansion valve throttle-expands the condensed coolant at low pressure and low temperature, and supplies the resultant coolant to the evaporator. The evaporator evaporates the coolant. In the evaporator, the thermal energy of the substance to be cooled is received by the coolant, so that the substance to be cooled is cooled, namely, the temperature of the substance to be cooled is lowered. In the condenser, the thermal energy of the coolant is supplied to a load fluid, so that the load fluid is heated, namely, the temperature of the load fluid is raised. The high-temperature heat pump device is applicable to a known system.

In the evaporator or the condenser of the high-temperature heat pump device, the fluid to be cooled or the fluid to be heated that exchanges heat with the coolant (heat transfer composition) may be air, water, brine, silicone oil or the like. Preferably, any one of these is selected in accordance with the cycle-driving temperature condition.

FIG. 1 is a schematic view showing an example of high-temperature heat pump device in which the heat transfer composition according to the present invention is usable. Hereinafter, a structure and an operation (repeat cycle) of the high-temperature heat pump device shown in FIG. 1 will be described.

A high-temperature heat pump device 100 according to the present invention includes an evaporator 11 that takes in heat and a condenser 13 that supplies heat. The high-temperature heat pump 100 further includes a compressor 12 that raises the pressure of a working medium (heat transfer composition) vapor that is supplied from the evaporator 11 and consumes electric power, and an expansion valve 14 that throttle-expands the supercooled liquid of the working medium that is supplied from the condenser 13.

While the operation of the high-temperature heat pump device 100 is repeated using the heat transfer composition according to the present invention, energy that is higher than the electric power put into the medium to be heated in the condenser 13 is extracted as thermal energy by the following steps (a) through (d).

(a) The working medium in a liquid state exchanges heat with a fluid to be cooled (air, water, etc.) in an heat exchanger (evaporator 11) and is evaporated.

(b) The evaporated working medium, namely, the evaporated coolant is extracted from the heat exchanger, and supplied to the compressor 12. Thus, high-pressure superheated vapor is supplied.

(c) The working medium coming out from the compressor 12 is supplied to the condenser 13, in which the working medium in a vapor state exchanges heat with the fluid to be heated (air, water, etc.) and is liquefied.

(d) The liquefied coolant is throttle-expanded by the expansion valve 14, and thus low-pressure wet vapor is supplied and subjected to the operation in step (a) again.

The high-temperature heat pump device accommodating the coolant includes at least one evaporator 11, expansion device 12, condenser 13 and expansion device 14, and a pipe used to transfer the coolant between these elements.

There is no specific limitation on the type of the compressor. Usable compressors include a single-stage or multi-stage centrifugal compressor, a rotary piston-type compressor, a rotary vane-type compressor, a scroll-type compressor, a screw-type compressor, and a piston-crank-type compressor.

By use of the heat transfer composition according to the present invention as the working medium of a vapor compression cycle system, warm water of a temperature higher than or equal to 60° C. is generated. Preferably, pressurized hot water or superheated vapor of a temperature higher than or equal to 80° C. is generated. More preferably, pressurized hot water or superheated vapor of a temperature higher than or equal to 110° C. is generated.

<Cleaner>

In the case where the azeotropic mixture-like composition according to the present invention is used for a cleaner, 1,1,1,3,3,3-hexafluoroisopropylmethylether is contained at a ratio higher than or equal to 0.1% by mass and lower than or equal to 99.9% by mass. Desirably, 1,1,1,3,3,3-hexafluoroisopropylmethylether is contained at a ratio higher than or equal to 33.0% by mass and lower than or equal to 99.9% by mass, and hexafluoroisopropanol is contained at a ratio higher than or equal to 0.1% by mass and lower than or equal to 67.0% by mass. Especially preferably, hexafluoroisopropanol is contained at a ratio higher than or equal to 0.1% by mass and lower than or equal to 10% by mass. Because of such a mixture ratio, the heat transfer composition according to the present invention has a global warming potential that is less than 150.

The azeotropic mixture-like composition according to the present invention, when being used for a solvent, a cleaner, a reaction solvent, a solvent for a paint, an extractant, a dewatering agent, a drying agent or the like, may optionally contain any of various types of surfactant in order to further improve the dissolution ability, the cleaning power or the like.

<Surfactant>

Usable surfactants include non-ionic surfactants, for example, sorbitan fatty acid esters such as sorbitan monooleate, sorbitan trioleate, and the like; polyoxyethylenesorbit fatty acid esters such as sorbit tetraoleate of polyoxyethylene, and the like; polyethyleneglycol fatty acid esters such as polyoxyethylenemonolaurate, and the like; polyoxyethylenealkylethers such as polyoxyethylenelaurylether, and the like; polyoxyethylenealkylphenylethers such as polyoxyethylenenonylphenylether, and the like; polyoxyethylenealkylamine fatty acid amides such as amide polyoxyethyleneoleate, and the like; etc. These may be used independently or in a combination of two or more. Such a non-ionic surfactant may be used together with a cationic surfactant or an anionic surfactant in order to synergistically improve the cleaning power and the interface effect. The amount of the surfactant depends on the type thereof or the like. Usually, the surfactant is contained at a ratio higher than or equal to 0.1% by mass and lower than or equal to 20% by mass, and is preferably contained at a ratio higher than or equal to 0.3% by mass and lower than or equal to 5% by mass, with respect to the composition according to the present invention.

The above-described compositions are especially preferable as cleaners for flux, cleaning solvents, degreased cleaners, or dewatering drying agents, and are highly useful as an alternative for CFC-113 or 1,1,1-trichloroethane, both of which are conventionally used. The compositions are specifically usable for removing agents for flux, grease, oil, wax, ink or the like; cleaners or dewatering drying agents for electronic components (printed circuit boards, liquid crystal displays, magnetic storage components, semiconductor materials, etc.), electric components, precision machinery components, resin processing components, optical lenses, clothes or the like; etc. Cleaning methods using these compositions may be conventional methods including immersion, spraying, boil cleaning, ultrasonic cleaning, vapor cleaning and the like, and a combination thereof.

EXAMPLES

Example 1

A composition containing 1,1,1,3,3,3-hexafluoroisopropylmethylether and hexafluoroisopropanol in a vapor-liquid equilibrium state was measured for the concentration of each of the components in a vapor phase and in a liquid phase as follows.

In order to find the concentration of each of the components in a vapor phase and in a liquid phase of the above-described composition in a vapor-liquid equilibrium state by gas chromatography, a calibration curve was created by use of a standard liquid prepared in advance to have a predetermined concentration. Table 1 shows the results.

A pressurization-type equilibrium distillation device (produced by Kyowa Science Co., Ltd.), used as a vapor-liquid equilibrium measurement device, is formed of a glass vessel having a closed bottom and an apex opened to the atmosphere. Brine set to have a temperature of 5° C. is caused to flow through a condenser, so that the vapor is entirely condensed and refluxed to a boiling point measurement device with certainty.

Figure 2:
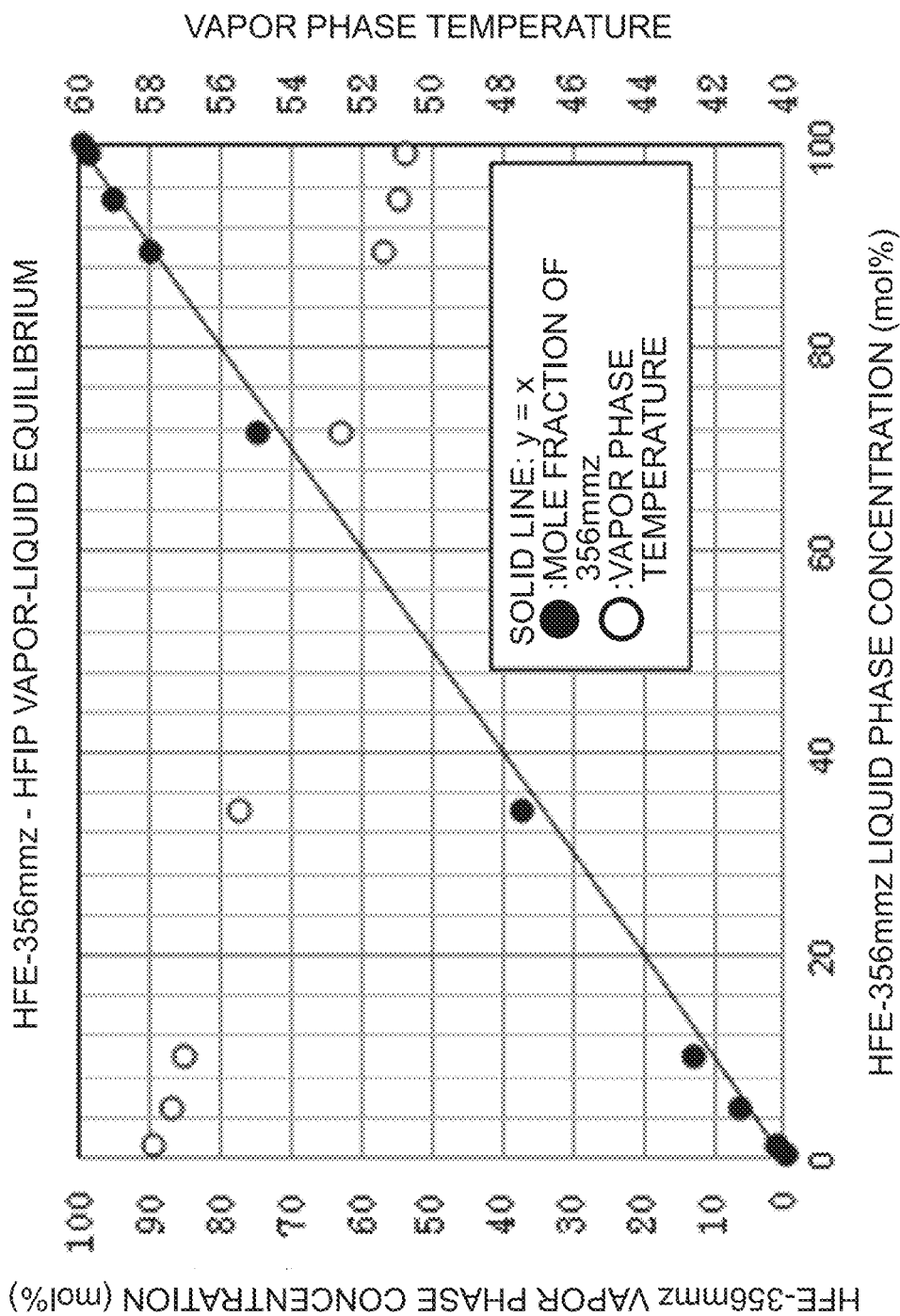
FIG. 2 shows a vapor-liquid equilibrium curve of example 1 according to the present invention.

A mixture specimen containing 1,1,1,3,3,3-hexafluoroisopropylmethylether and hexafluoroisopropanol at a certain mixture ratio was put into a specimen vessel and heated. The heating temperature was adjusted such that the vapor-phase condensed liquid would drip at a certain dripping rate. After the reflux of the mixture specimen was visually confirmed to be stabilized, the reflux state was maintained for 30 minutes or longer. The pressure was kept at 103.1 kPa. The temperature of the mixture specimen in the reflux state was measured. The liquid-phase condensed liquid and the vapor-phase condensed liquid were sampled and analyzed by gas chromatography. The mixture ratio of each condensed liquid was calculated based on the calibration curve created in advance. Table 2 and FIG. 2 show the results.

TABLE 1

| Feed composition molar ratio (HFIP/356mmz) | GC surface area ratio (HFIP/356mmz) |
|---|---|
| 111.158 | 37.518 |
| 32.137 | 10.805 |
| 19.225 | 5.999 |
| 9.019 | 2.913 |
| 2.334 | 0.727 |
| 1.002 | 0.274 |
| 0.111 | 0.033 |
| 0.053 | 0.015 |
| 0.031 | 0.009 |
| 0.011 | 0.003 |

TABLE 2

| Temperature [° C.] | 356mmz [mol %] | | 356mmz [wt %] | | 356mmz Vapor phase - liquid phase | |
|---|---|---|---|---|---|---|
| | Liquid phase | Vapor phase | Liquid phase | Vapor phase | [mol %] | [wt %] |
| 58.1 | 1.00 | 1.19 | 1.08 | 1.29 | 0.19 | 0.21 |
| 57.5 | 4.80 | 6.53 | 5.18 | 7.04 | 1.73 | 1.86 |
| 57.1 | 9.83 | 13.14 | 10.56 | 14.08 | 3.31 | 3.52 |
| 55.5 | 34.08 | 37.64 | 35.90 | 39.54 | 3.56 | 3.64 |
| 52.7 | 71.29 | 74.96 | 72.90 | 76.43 | 3.67 | 3.53 |
| 51.3 | 89.34 | 90.18 | 90.08 | 90.87 | 0.84 | 0.79 |
| 51.1 | 94.35 | 95.30 | 94.76 | 95.65 | 0.95 | 0.88 |
| 50.9 | 98.94 | 99.10 | 99.02 | 99.17 | 0.16 | 0.15 |

The results shown in Table 2 and FIG. 2 indicate that a mixture composition of 1,1,1,3,3,3-hexafluoroisopropylmethylether and hexafluoroisopropanol having any mixture ratio forms an azeotropic mixture-like composition. Especially, in a composition containing 1,1,1,3,3,3-hexafluoroisopropylmethylether at a ratio higher than or equal to 90% by mass and hexafluoroisopropanol at a ratio lower than or equal to 10% by mass, the difference between the mass percentage of 1,1,1,3,3,3-hexafluoroisopropylmethylether in a vapor phase portion and a mass percentage thereof in a liquid phase portion was found to be lower than or equal to 1% by mass.

Example 2

A fitted curve was created by calculation using the least squares method by use of data on the concentration (molar ratio) and the temperature of 1,1,1,3,3,3-hexafluoroisopropylmethylether shown in Table 2. From the resultant fitted curve, the boiling point and the dew point of the composition of 1,1,1,3,3,3-hexafluoroisopropylmethylether and hexafluoroisopropanol were calculated. Table 3 shows the results.

TABLE 3

| Molar ratio | | Mass ratio | | Boiling point [° C.] | Dew point [° C.] | Dew point - boiling point [° C.] | GWP |
|---|---|---|---|---|---|---|---|
| 356mmz | HFIP | 356mmz | HFIP | | | | |
| 0.75 | 0.25 | 0.76 | 0.24 | 52.34 | 52.69 | 0.35 | 70.1 |
| 0.80 | 0.20 | 0.81 | 0.19 | 51.91 | 52.13 | 0.22 | 61.3 |
| 0.85 | 0.15 | 0.86 | 0.14 | 51.55 | 51.67 | 0.12 | 52.6 |
| 0.90 | 0.10 | 0.91 | 0.09 | 51.25 | 51.31 | 0.06 | 44.0 |
| 0.91 | 0.09 | 0.92 | 0.08 | 51.20 | 51.24 | 0.05 | 42.3 |
| 0.92 | 0.08 | 0.93 | 0.07 | 51.15 | 51.19 | 0.04 | 40.6 |
| 0.93 | 0.07 | 0.94 | 0.06 | 51.10 | 51.13 | 0.03 | 38.9 |
| 0.94 | 0.06 | 0.94 | 0.06 | 51.06 | 51.08 | 0.03 | 37.2 |
| 0.95 | 0.05 | 0.95 | 0.05 | 51.01 | 51.04 | 0.02 | 35.5 |
| 0.96 | 0.04 | 0.96 | 0.04 | 50.98 | 50.99 | 0.02 | 33.8 |
| 0.97 | 0.03 | 0.97 | 0.03 | 50.94 | 50.96 | 0.02 | 32.1 |
| 0.98 | 0.02 | 0.98 | 0.02 | 50.90 | 50.92 | 0.02 | 30.4 |
| 0.99 | 0.01 | 0.99 | 0.01 | 50.87 | 50.89 | 0.02 | 28.7 |
| 0.995 | 0.005 | 0.995 | 0.005 | 50.86 | 50.88 | 0.02 | 27.8 |
| 0.999 | 0.001 | 0.999 | 0.001 | 50.85 | 50.87 | 0.02 | 27.2 |

The results shown in Table 3 indicate that a mixture composition of 1,1,1,3,3,3-hexafluoroisopropylmethylether and hexafluoroisopropanol having any mixture ratio forms an azeotropic mixture-like composition. Especially, in a composition containing 1,1,1,3,3,3-hexafluoroisopropylmethylether at a ratio higher than or equal to 90% by mass and hexafluoroisopropanol at a ratio lower than or equal to 10% by mass, the temperature difference between the dew point and the boiling point at 103.1 kPa was found to be less than or equal to 0.1° C.

Coefficient of performance (COP) is a generally recognized index of coolant performance, and is especially useful to represent a relative thermodynamic efficiency of a heat transfer composition in a particular heating or cooling cycle including evaporation or condensation of the heat transfer composition. The ratio of the heat quantity that the coolant accepts in an evaporator from the medium to be cooled, with respect to the work added by a compressor at the time of compression, is represented by $COP_R$. By contrast, the ratio of the heat quantity that the heat transfer composition releases in a condenser to the medium to be heated, with respect to the work added by a compressor at the time of compression, is represented by $COP_H$.

The volume capacity of a heat transfer composition represents the heat quantity for cooling or heating that is supplied by the heat transfer composition, per unit suction volume of a compressor. Namely, as the volume capacity of a heat transfer composition for a particular compressor is larger, the heat transfer composition can absorb or release a larger quantity of heat.

Example 3

Mixture Heat Transfer Composition of 1,1,1,3,3,3-hexafluoroisopropylmethylether and hexafluoroisopropanol In a performance evaluation of a high-temperature heat pump cycle conducted by use of a mixture heat transfer composition of 1,1,1,3,3,3-hexafluoroisopropylmethylether and hexafluoroisopropanol, the coefficient of performance was calculated under the conditions shown in Table 4. The property values of the heat transfer composition were found based on REFPROP, ver. 9 issued by National Institute of Standards and Technology (NIST) of the United States.

Table 4 shows high-temperature heat pump cycle calculation conditions 1.

TABLE 4

| High-temperature heat pump cycle calculation conditions 1 | | |
|---|---|---|
| Evaporation temperature | $T_{EVA}$ | 30 [° C.] |
| Condensation temperature | $T_{CON}$ | 90 [° C.] |
| Superheating degree | $T_{sh}$ | 15 [K] |
| Supercooling degree | $T_{sc}$ | 10 [K] |
| Compressor efficiency | η | 0.7 [—] |

The heat pump cycle calculation conditions 1 are set with an assumption that hot water of a temperature of 80° C. is generated in the condenser by heat exchange of the heat transfer composition and the heat source water.

For calculating the coefficient of performance ($COP_H$) of the high-temperature heat pump cycle, the following conditions were set.
(A) The compression process of the compressor is isentropic compression.
(B) The throttle-expansion process of the expansion valve is isenthalpic expansion.
(C) The heat loss and the pressure loss in the pipe and the heat exchanger are ignored.
(D) The compressor efficiency η is 0.7.

Hereinafter, the expressions used to calculate the coefficient of performance ($COP_H$) of the high-temperature heat pump cycle will be described in detail. The heat quantity $Q_{EVA}$ input to the evaporator is:

$$Q_{EVA} = G \times (h_1 - h_4) \quad (1).$$

The heat quantity $Q_{CON}$ released from the condenser is:

$$Q_{CON} = G \times (h_2 - h_3) \quad (2).$$

Where the enthalpy of the heat transfer composition, which has been subjected to the isentropic compression, at the exit of the compressor is represented by $h_{2th}$, the enthalpy $h_2$ of the heat transfer composition at the exit of the compressor in consideration of the compressor efficiency is:

$$h_2 = h_1 + (h_{2th} - h_1)/\eta \quad (3).$$

The work W added by the compressor at the time of compressing the heat transfer composition vapor is:

$$W = G \times (h_2 - h_1) \quad (4).$$

The coefficient of performance ($COP_H$) of the high-temperature heat pump cycle is:

$$COP_H = Q_{GC}/W = (h_2 - h_3)/(h_2 - h_1) \quad (5).$$

Now, the expression used to calculate the volume capacity (CAP) of the heat transfer composition will be described in detail. The vapor density of the heat transfer composition at the suction opening of the compressor is $\rho_2$. The heat quantity of the gas cooler is $Q_{ac}$. Therefore, $$CAP = \rho_2 \times Q_{GC} = \rho_2 \times (h_2 - h_3) \quad (6).$$

Figure 3:
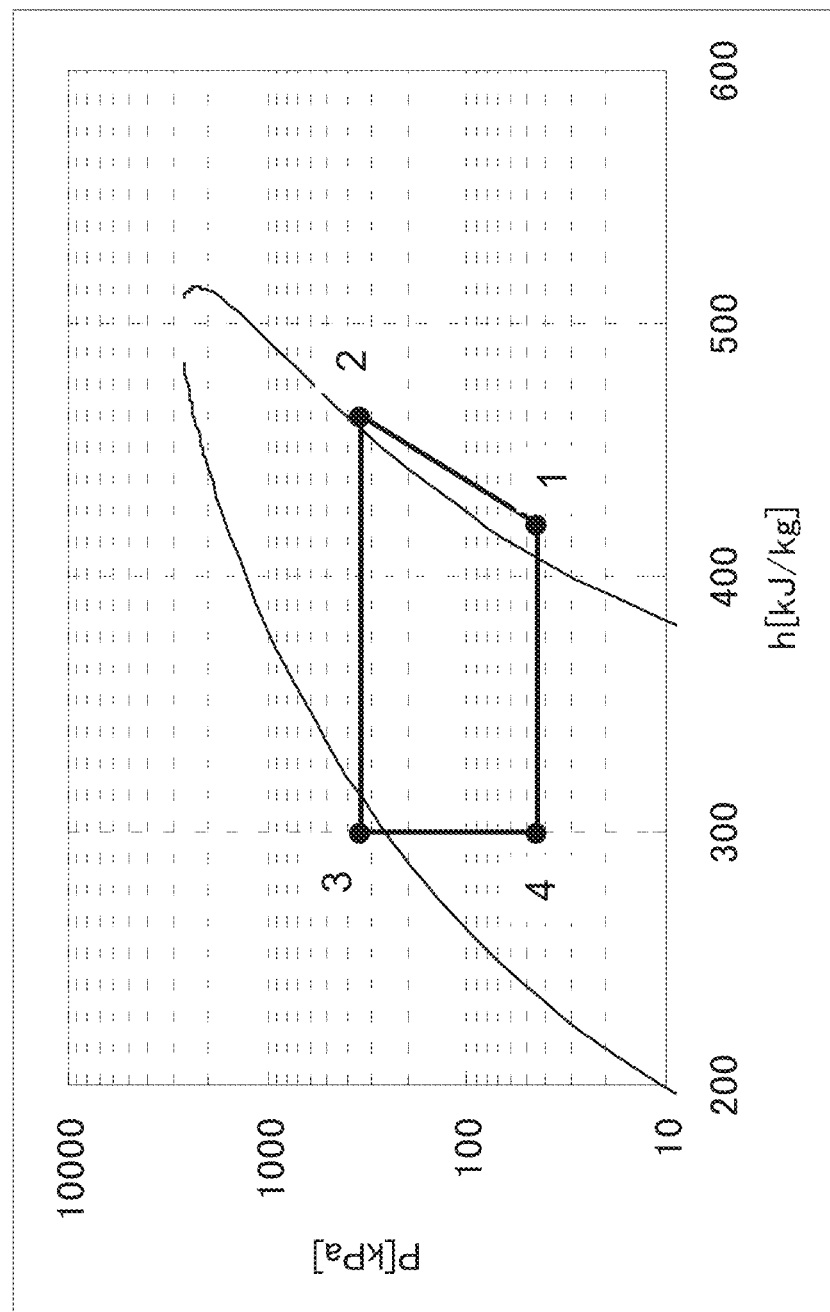
FIG. 3 is a P-h diagram of example 3 according to the present invention.

In (1) through (6) above, the symbols represent the following.
G: Circulation amount of the heat transfer composition
W: Compression work
$Q_{EVA}$: Input heat quantity
$Q_{CON}$: Released heat quantity
$COP_H$: Coefficient of performance (heating)
CAP: Volume capacity (heating)
h: Specific enthalpy
1, 2, 3, 4: Cycle point
2th: Cycle point after the isentropic compression
FIG. 3 is a P-h diagram of example 3 (mass ratio of 1,1,1,3,3,3-hexafluoroisopropylmethylether:hexafluoroisopropanol is 95:5). In FIG. 3, cycle points 1, 2, 3 and 4 represent the high-temperature heat pump cycle calculation conditions 1.

Example 4

Figure 4:
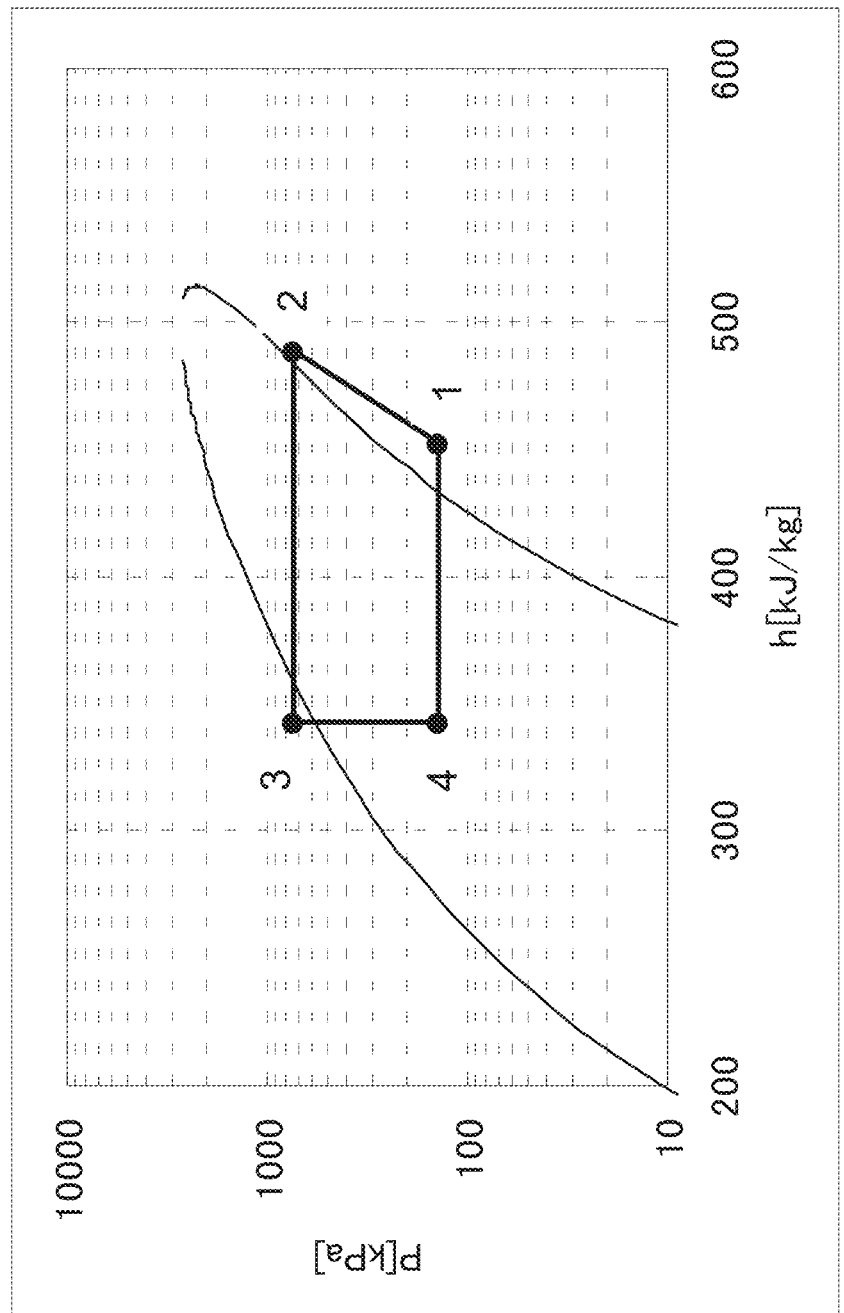
FIG. 4 is a P-h diagram of example 4 according to the present invention.

Mixture Heat Transfer Composition of 1,1,1,3,3,3-hexafluoroisopropylmethylether and hexafluoroisopropanol In a performance evaluation of a high-temperature heat pump cycle conducted by use of a mixture heat transfer composition of 1,1,1,3,3,3-hexafluoroisopropylmethylether and hexafluoroisopropanol, the coefficient of performance was calculated under the conditions shown in Table 5. FIG. 4 is a P-h diagram of example 4 (mass ratio of 1,1,1,3,3,3-hexafluoroisopropylmethylether:hexafluoroisopropanol is 95:5).

Table 5 shows high-temperature heat pump cycle calculation conditions 2.

TABLE 5

| High-temperature heat pump cycle calculation conditions 2 | | | |
|---|---|---|---|
| Evaporation temperature | $T_{EVA}$ | 60 | [° C.] |
| Condensation temperature | $T_{CON}$ | 120 | [° C.] |
| Superheating degree | $T_{sh}$ | 15 | [K] |
| Supercooling degree | $T_{sc}$ | 10 | [K] |
| Compressor efficiency | $\eta$ | 0.7 | [—] |

The heat pump cycle calculation conditions 2 are set with an assumption that pressurized hot water of a temperature of 110° C. is generated in the condenser by heat exchange of the heat transfer composition and the heat source water.

Example 5

Figure 5:
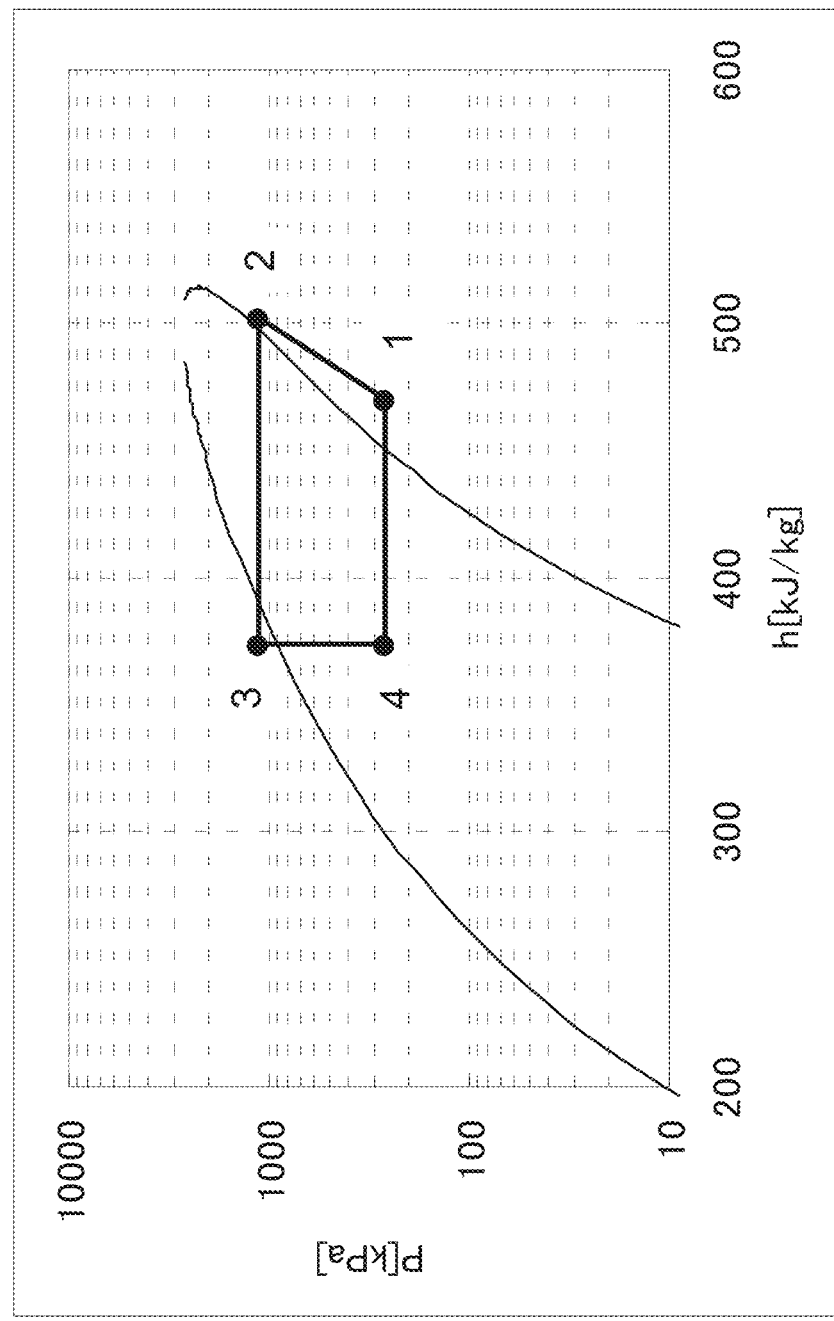
FIG. 5 is a P-h diagram of example 5 according to the present invention.

Mixture Heat Transfer Composition of 1,1,1,3,3,3-hexafluoroisopropylmethylether and hexafluoroisopropanol In a performance evaluation of a high-temperature heat pump cycle conducted by use of a mixture heat transfer composition of 1,1,1,3,3,3-hexafluoroisopropylmethylether and hexafluoroisopropanol, the coefficient of performance was calculated under the conditions shown in Table 6. FIG. 5 is a P-h diagram of example 5 (mass ratio of 1,1,1,3,3,3-hexafluoroisopropylmethylether:hexafluoroisopropanol is 95:5).

Table 6 shows high-temperature heat pump cycle calculation conditions 3.

TABLE 6

| High-temperature heat pump cycle calculation conditions 3 | | | |
|---|---|---|---|
| Evaporation temperature | $T_{EVA}$ | 80 | [° C.] |
| Condensation temperature | $T_{CON}$ | 140 | [° C.] |
| Superheating degree | $T_{sh}$ | 20 | [K] |
| Supercooling degree | $T_{sc}$ | 10 | [K] |
| Compressor efficiency | $\eta$ | 0.7 | [—] |

Comparative Example 1

Figure 6:
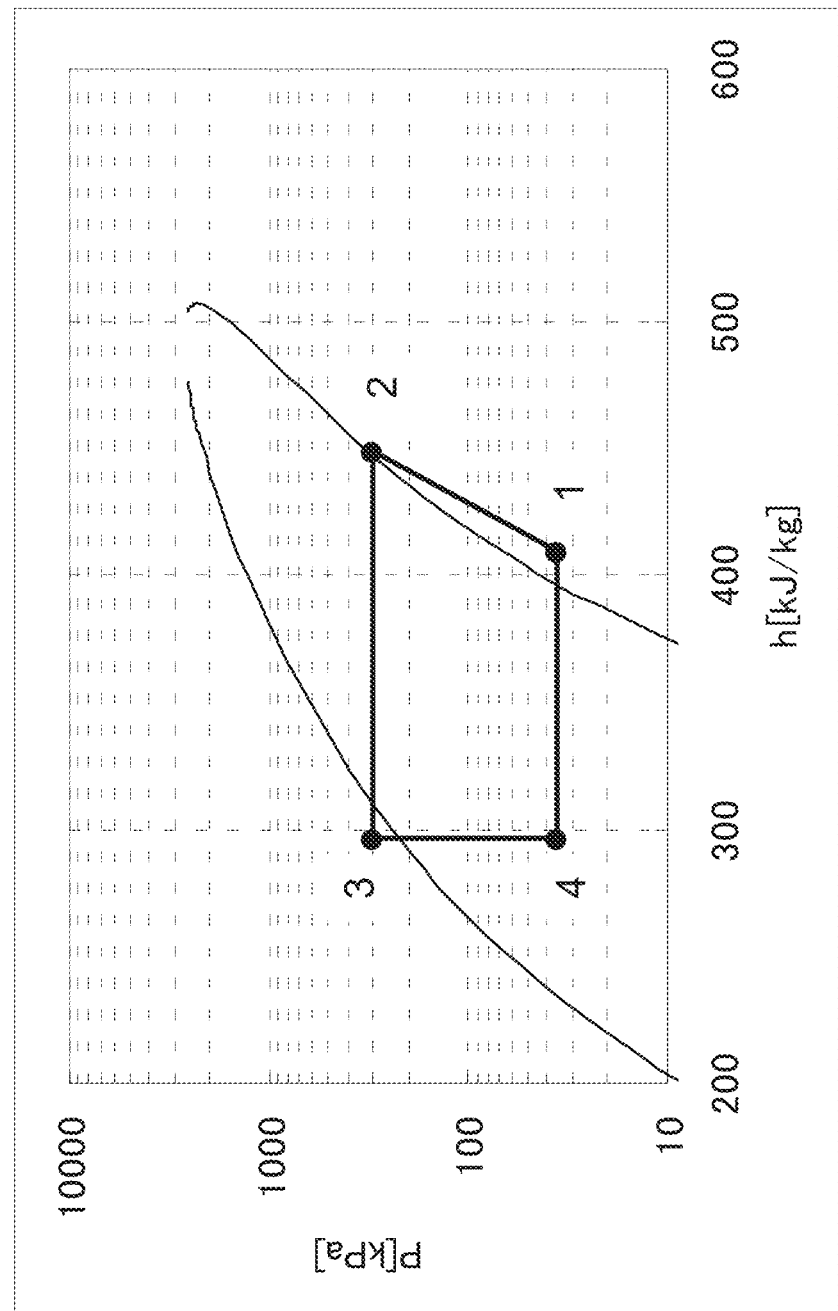
FIG. 6 is a P-h diagram of comparative example 1.

1,1,2,2-tetrafluoroethyl-2,2,2-trifluoroethylether 1,1,2,2-tetrafluoroethyl-2,2,2-trifluoroethylether, which is similar to 1,1,1,3,3,3-hexafluoroisopropylmethylether in the structure and the properties, was used, instead of the heat transfer composition according to the present invention, for a performance evaluation of a high-temperature heat pump cycle. In the performance evaluation, the coefficient of performance was calculated under the conditions shown in Table 4. FIG. 6 is a P-h diagram of comparative example 1 (1,1,2,2-tetrafluoroethyl-2,2,2-trifluoroethylether).
<HFE-347pc-f>
1,1,2,2-tetrafluoroethyl-2,2,2-trifluoroethylether (HFE-347pc-f) is non-flammable and is not highly toxic. HFE-347pc-f has a boiling point of 56° C. at an atmospheric pressure, an atmospheric life time of 7.1 years, and a global warming potential (GWP) of 580 (Industrial & Engineering Chemistry Research 2012, Vol. 51, pp. 12537-12548).

Comparative Example 2

1,1,2,2-tetrafluoroethyl-2,2,2-trifluoroethylether

Figure 7:
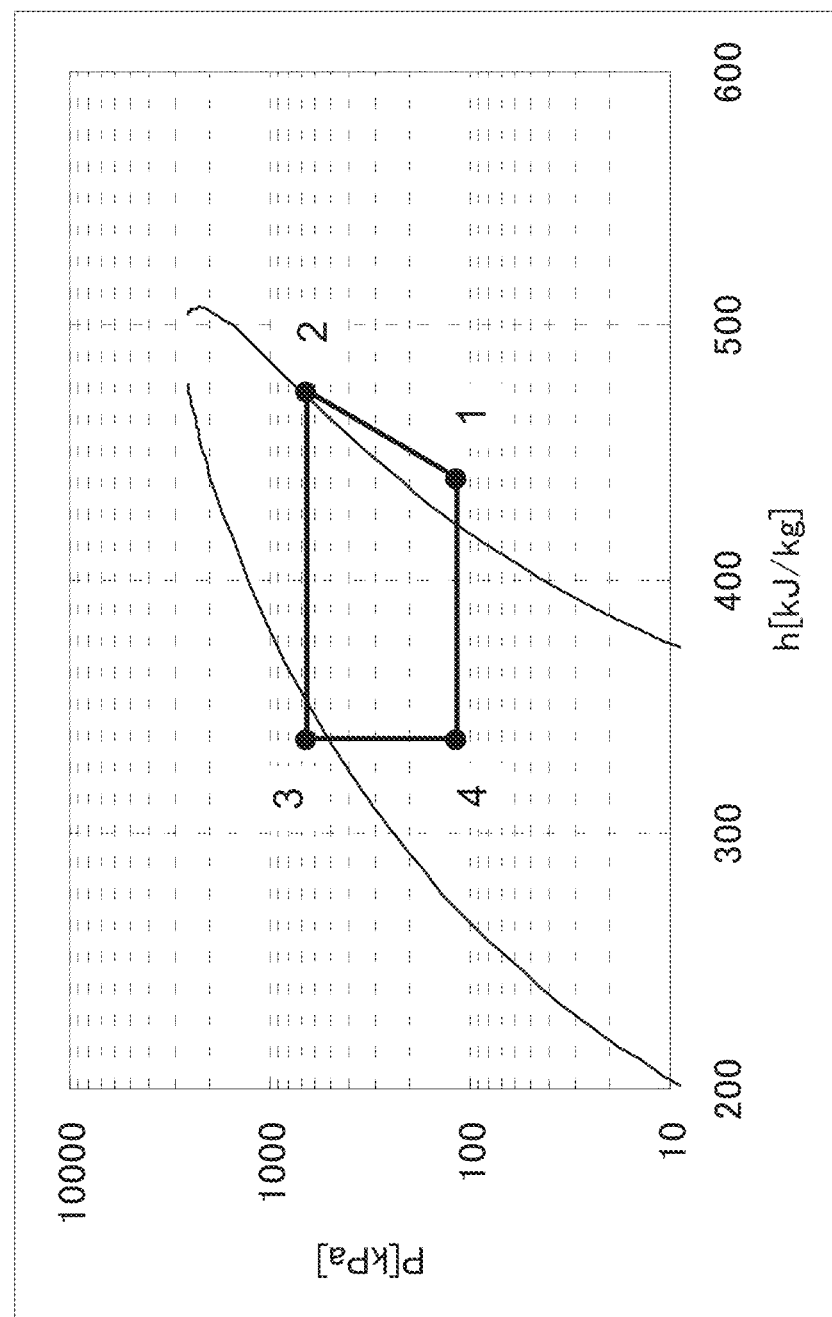
FIG. 7 is a P-h diagram of comparative example 2.

In a performance evaluation of a high-temperature heat pump cycle conducted by use of 1,1,2,2-tetrafluoroethyl-2,2,2-trifluoroethylether instead of the heat transfer composition according to the present invention, the coefficient of performance was calculated under the conditions shown in Table 5. FIG. 7 is a P-h diagram of comparative example 2 (1,1,2,2-tetrafluoroethyl-2,2,2-trifluoroethylether).

Comparative Example 3

1,1,2,2-tetrafluoroethyl-2,2,2-trifluoroethylether

Figure 8:
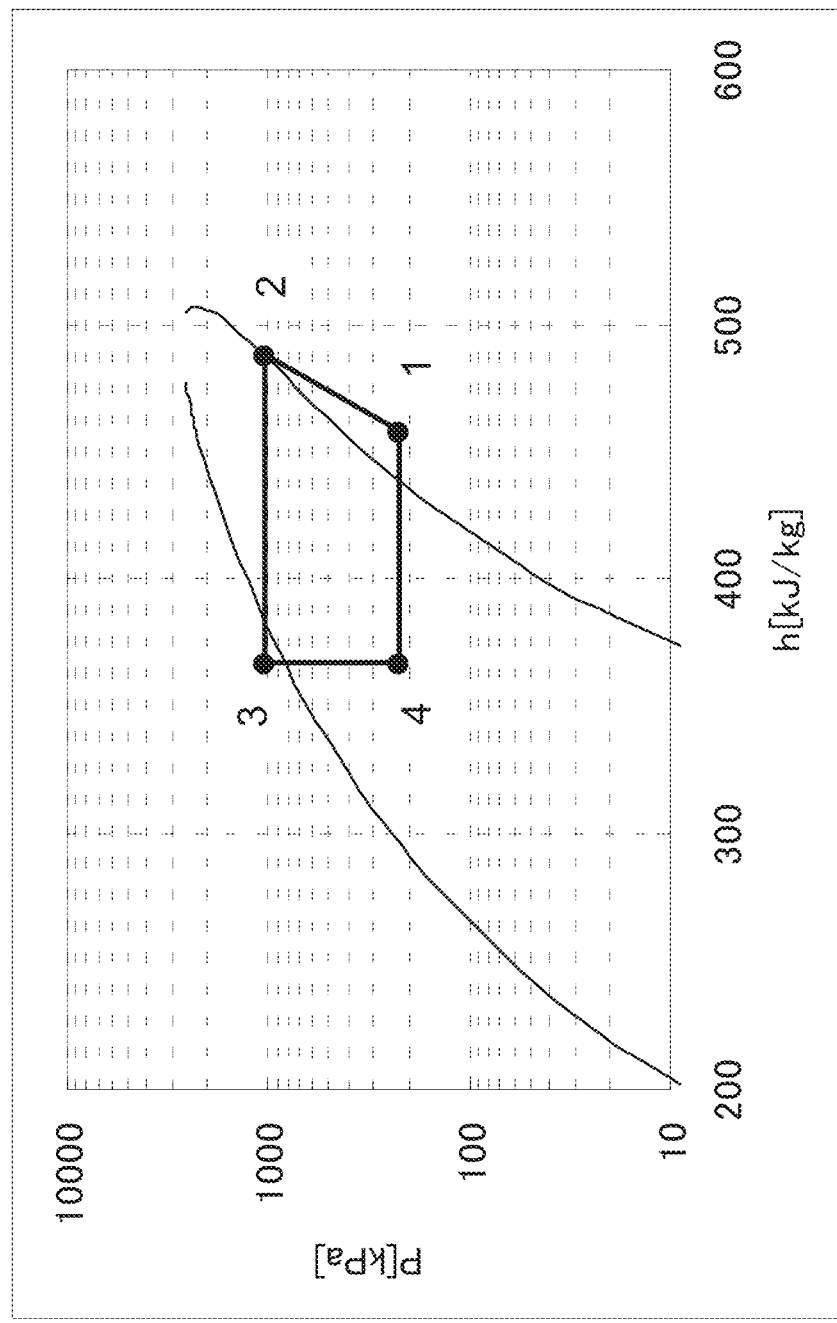
FIG. 8 is a P-h diagram of comparative example 3.

In a performance evaluation of a high-temperature heat pump cycle conducted by use of 1,1,2,2-tetrafluoroethyl-2,2,2-trifluoroethylether instead of the heat transfer composition according to the present invention, the coefficient of performance was calculated under the conditions shown in Table 6. FIG. 8 is a P-h diagram of comparative example 3 (1,1,2,2-tetrafluoroethyl-2,2,2-trifluoroethylether).

Tables 7 through 12 show the calculation results on the coefficient of performance ($COP_H$) of the high-temperature heat pump cycles in examples 3 through 5 and comparative examples 1 through 3.

For examples 3, 4 and 5, the values of a first component and a second component of the heat transfer composition are represented by mass percentage. In examples 3 through 5, the first component is 1,1,1,3,3,3-hexafluoroisopropylmethylether and the second component is hexafluoroisopropanol.

In comparative examples 1, 2 and 3, the mixture heat transfer composition is 1,1,2,2-tetrafluoroethyl-2,2,2-trifluoroethylether.

The relative COP value and the relative CAP value of example 3 shown in Table 7 were respectively calculated with respect to the COP value and the CAP value of comparative example 1 shown in Table 10, namely, with the COP value and the CAP value of comparative example 1 being 1.00. Similarly, the relative COP value and the relative CAP value of example 4 shown in Table 8 were respectively calculated with respect to the COP value and the CAP value of comparative example 2 shown in Table 11, namely, with the COP value and the CAP value of comparative example 2 being 1.00. The relative COP value and the relative CAP value of example 5 shown in Table 9 were respectively calculated with respect to the COP value and the CAP value of comparative example 3 shown in Table 12, namely, with the COP value and the CAP value of comparative example 3 being 1.00.

Example 3

Mixture Heat Transfer Composition of 1,1,1,3,3,3-hexafluoroisopropylmethylether and hexafluoroisopropanol; Calculation Conditions 1

TABLE 7

| First component | Second component | GWP | $T_2$ [°C.] | $P_{EVA}$ [kPa] | $P_{CON}$ [kPa] | Pressure ratio [—] | Relative COP [—] | Relative CAP [—] |
|---|---|---|---|---|---|---|---|---|
| 1 | 99 | 208 | 172 | 29 | 331 | 11.4 | 1.04 | 1.08 |
| 10 | 90 | 192 | 159 | 31 | 336 | 11.0 | 1.04 | 1.10 |
| 20 | 80 | 173 | 147 | 32 | 341 | 10.6 | 1.04 | 1.12 |
| 30 | 70 | 155 | 136 | 34 | 345 | 10.2 | 1.04 | 1.14 |
| 33 | 67 | 150 | 134 | 34 | 346 | 10.0 | 1.04 | 1.15 |
| 40 | 60 | 137 | 127 | 36 | 348 | 9.7 | 1.04 | 1.16 |
| 50 | 50 | 119 | 120 | 38 | 349 | 9.3 | 1.03 | 1.18 |
| 60 | 40 | 100 | 113 | 39 | 350 | 8.9 | 1.03 | 1.19 |
| 70 | 30 | 82 | 107 | 41 | 350 | 8.5 | 1.02 | 1.20 |
| 80 | 20 | 64 | 102 | 43 | 349 | 8.2 | 1.01 | 1.21 |
| 90 | 10 | 45 | 97 | 44 | 347 | 7.9 | 1.01 | 1.20 |
| 95 | 5 | 36 | 95 | 45 | 345 | 7.7 | 1.00 | 1.20 |
| 99 | 1 | 29 | 93 | 45 | 344 | 7.6 | 1.00 | 1.20 |

Example 4

Mixture Heat Transfer Composition of 1,1,1,3,3,3-hexafluoroisopropylmethylether and hexafluoroisopropanol; Calculation Conditions 2

TABLE 8

| First component | Second component | GWP | $T_2$ [°C.] | $P_{EVA}$ [kPa] | $P_{CON}$ [kPa] | Pressure ratio [—] | Relative COP [—] | Relative CAP [—] |
|---|---|---|---|---|---|---|---|---|
| 1 | 99 | 208 | 185 | 113 | 801 | 7.1 | 1.05 | 1.28 |
| 10 | 90 | 192 | 175 | 116 | 802 | 6.9 | 1.05 | 1.28 |
| 20 | 80 | 173 | 166 | 120 | 801 | 6.7 | 1.05 | 1.27 |
| 30 | 70 | 155 | 157 | 124 | 798 | 6.5 | 1.05 | 1.27 |
| 33 | 67 | 150 | 155 | 125 | 797 | 6.4 | 1.05 | 1.27 |
| 40 | 60 | 137 | 150 | 127 | 793 | 6.2 | 1.05 | 1.26 |
| 50 | 50 | 119 | 144 | 130 | 786 | 6.0 | 1.04 | 1.25 |
| 60 | 40 | 100 | 139 | 133 | 778 | 5.9 | 1.03 | 1.24 |
| 70 | 30 | 82 | 134 | 135 | 768 | 5.7 | 1.03 | 1.22 |
| 80 | 20 | 64 | 130 | 137 | 756 | 5.5 | 1.02 | 1.20 |
| 90 | 10 | 45 | 126 | 138 | 744 | 5.4 | 1.01 | 1.17 |
| 95 | 5 | 36 | 125 | 139 | 737 | 5.3 | 1.00 | 1.15 |
| 99 | 1 | 29 | 123 | 139 | 731 | 5.3 | 1.00 | 1.14 |

Example 5

Mixture Heat Transfer Composition of 1,1,1,3,3,3-hexafluoroisopropylmethylether and hexafluoroisopropanol; Calculation Conditions 3

TABLE 9

| First component | Second component | GWP | $T_2$ [°C.] | $P_{EVA}$ [kPa] | $P_{CON}$ [kPa] | Pressure ratio [—] | Relative COP [—] | Relative CAP [—] |
|---|---|---|---|---|---|---|---|---|
| 1 | 99 | 208 | 196 | 237 | 1330 | 5.6 | 1.07 | 1.41 |
| 10 | 90 | 192 | 187 | 242 | 1321 | 5.5 | 1.07 | 1.40 |
| 20 | 80 | 173 | 179 | 247 | 1309 | 5.3 | 1.06 | 1.38 |
| 30 | 70 | 155 | 172 | 251 | 1294 | 5.2 | 1.06 | 1.36 |
| 33 | 67 | 150 | 170 | 252 | 1289 | 5.1 | 1.06 | 1.35 |
| 40 | 60 | 137 | 166 | 254 | 1276 | 5.0 | 1.06 | 1.33 |
| 50 | 50 | 119 | 161 | 257 | 1256 | 4.9 | 1.05 | 1.30 |
| 60 | 40 | 100 | 156 | 259 | 1234 | 4.8 | 1.04 | 1.27 |
| 70 | 30 | 82 | 152 | 260 | 1210 | 4.6 | 1.03 | 1.23 |
| 80 | 20 | 64 | 148 | 261 | 1184 | 4.5 | 1.02 | 1.19 |
| 90 | 10 | 45 | 145 | 260 | 1158 | 4.4 | 1.00 | 1.15 |
| 95 | 5 | 36 | 144 | 260 | 1144 | 4.4 | 1.00 | 1.13 |
| 99 | 1 | 29 | 142 | 259 | 1133 | 4.4 | 0.99 | 1.11 |

Comparative Example 1

1,1,2,2-tetrafluoroethyl-2,2,2-trifluoroethylether; Calculation Conditions 1

TABLE 10

| GWP | $T_2$ [°C.] | $P_{EVA}$ [kPa] | $P_{CON}$ [kPa] | Pressure ratio [—] | Relative COP [—] | Relative CAP [—] |
|---|---|---|---|---|---|---|
| 580 | 92 | 36 | 299 | 8.25 | 1.00 | 1.00 |

Comparative Example 2

1,1,2,2-tetrafluoroethyl-2,2,2-trifluoroethylether; Calculation Conditions 2

TABLE 11

| GWP | $T_2$ [°C.] | $P_{EVA}$ [kPa] | $P_{CON}$ [kPa] | Pressure ratio [—] | Relative COP [—] | Relative CAP [—] |
|---|---|---|---|---|---|---|
| 580 | 122 | 117 | 653 | 5.60 | 1.00 | 1.00 |

Comparative Example 3

1,1,2,2-tetrafluoroethyl-2,2,2-trifluoroethylether;
Calculation Conditions 3

TABLE 12

| GWP | $T_2$ [° C.] | $P_{EVA}$ [kPa] | $P_{CON}$ [kPa] | Pressure ratio [—] | Relative COP [—] | Relative CAP [—] |
|---|---|---|---|---|---|---|
| 580 | 141 | 223 | 1027 | 4.60 | 1.00 | 1.00 |

As shown in Tables 7 through 12, the mixture heat transfer compositions according to the present invention have a volume capacity that is higher than that of, and a coefficient of performance that is equivalent to that of, 1,1,2,2-tetrafluoroethyl-2,2,2-trifluoroethylether described in WO2007/105724, when being applied to a high-temperature heat pump. These results indicate that when any of the mixture heat transfer compositions according to the present invention is used for a high-temperature heat pump, the volume of the compressor can be smaller than when 1,1,2,2-tetrafluoroethyl-2,2,2-trifluoroethylether is used for supplying the same quantity of heat.

Example 6

A thermal stability test was performed by use of 1,1,1,3,3,3-hexafluoroisopropylmethylether. In conformity to the sealed tube test of JIS-K-2211, "Refrigerating machine oils", 1.0 g of 1,1,1,3,3,3-hexafluoroisopropylmethylether and metal pieces (test pieces of iron, copper, and aluminum) were sealed in a glass test tube, heated to 175° C. and kept for 14 days. Fourteen days later, the external appearance, the purity and the acid content ($F^-$ ion) of the 1,1,1,3,3,3-hexafluoroisopropylmethylether were measured to evaluate the thermal stability. Table 13 shows the results.

Example 6

Thermal Stability Test of
1,1,1,3,3,3-hexafluoroisopropylmethylether; 175°
C.×14 Days

TABLE 13

| Temperature [° C.] | After the test GC % | Acid content ($F^-$) [ppm] | External appearance |
|---|---|---|---|
| Before the test | 99.98 | None | Colorless, transparent |
| 175 | 99.98 | <1 | Colorless, transparent |

Example 7

A thermal stability test was performed by use of hexafluoroisopropanol. In conformity to the sealed tube test of JIS-K-2211, "Refrigerating machine oils", 1.0 g of hexafluoroisopropanol and metal pieces (test pieces of iron, copper, and aluminum) were sealed in a glass test tube, heated to 175° C. and kept for 14 days. Fourteen days later, the external appearance, the purity and the acid content ($F^-$ ion) of hexafluoroisopropanol were measured to evaluate the thermal stability. Table 14 shows the results.

Example 7

Thermal Stability Test of hexafluoroisopropanol;
175° C.×14 Days

TABLE 14

| Temperature [° C.] | After the test GC % | Acid content ($F^-$) [ppm] | External appearance |
|---|---|---|---|
| Before the test | 99.98 | None | Colorless, transparent |
| 175 | 99.98 | <1 | Colorless, transparent |

As is clear from the results shown in Tables 13 and 14, no thermal decomposition product of 1,1,1,3,3,3-hexafluoroisopropylmethylether or hexafluoroisopropanol was observed. The acid content ($F^-$ ion) generated as a byproduct after the thermal stability test was performed was minute. It is seen that the heat transfer composition according to the present invention has high thermal stability even under a high temperature condition.

Example 8

In conformity to the compatibility test of a heat transfer composition and refrigerating machine oil of JIS-K-2211, "Refrigerating machine oils", 1.7 g of heat transfer composition and 0.3 g of refrigerating machine oil were put into a thick glass test tube and cooled with liquid nitrogen, and thus a mixture of the heat transfer composition and the refrigerating machine oil was solidified. After the mixture of the heat transfer composition and the refrigerating machine oil was solidified, a top part of the test tube was connected to a vacuum pump to remove the remaining air, and the top part of the test tube was sealed by use of a gas burner. The sealed thick glass test tube was put into a thermostat cooled to −20° C., and kept still until the temperature of the thermostat and the temperature of the composition in the glass test tube became equal to each other. Then, the compatibility of the heat transfer composition and the refrigerating machine oil was evaluated by visual observation. For evaluating the compatibility, the temperature of the thermostat was changed from −20 to +80° C. Tables 15 through 19 show the results. In Tables 15 through 19, "O" indicates that the heat transfer composition and the refrigerating machine oil were compatible and uniformly mixed. "X" indicates that the heat transfer composition and the refrigerating machine oil were separated into two layers, or that the composition was clouded.

For the compatibility test, the following five types of lubricant were used.

Mineral oil (MO): SUNISO 4GS (produced by Japan Sun Oil Company, Ltd.)

Polyolester oil (POE): SUNICE T68 (produced by Japan Sun Oil Company, Ltd.)

Alkylbenzene oil (AB): ATMOS 68N (produced by JX Nippon Oil & Energy Corporation)

Polyalkyleneglycol oil (PAG): SUNICE P56 (produced by Japan Sun Oil Company, Ltd.)

Polyvinylether oil (PVE): Daphne Hermetic Oil FVC68D (produced by Idemitsu Kosan Co., Ltd.)

TABLE 15

| Refrigerating machine oil: mineral oil (SUNISO 4GS) | | |
| --- | --- | --- |
| Temperature [° C.] | HFE-356mmz | HFIP |
| −20 | X | X |
| 0 | X | X |
| 20 | X | X |
| 40 | X | X |
| 60 | X | X |
| 80 | X | X |

TABLE 16

| Refrigerating machine oil: Polyolester oil (SUNICE T68) | | |
| --- | --- | --- |
| Temperature [° C.] | HFE-356mmz | HFIP |
| −20 | ○ | ○ |
| 0 | ○ | ○ |
| 20 | ○ | ○ |
| 40 | ○ | ○ |
| 60 | ○ | ○ |
| 80 | ○ | ○ |

TABLE 17

| Refrigerating machine oil: Alkylbenzene oil (ATMOS 68N) | | |
| --- | --- | --- |
| Temperature [° C.] | HFE-356mmz | HFIP |
| −20 | X | X |
| 0 | X | X |
| 20 | X | X |
| 40 | X | X |
| 60 | X | X |
| 80 | X | X |

TABLE 18

| Refrigerating machine oil: Polyalkyleneglycol oil (SUNICE P56) | | |
| --- | --- | --- |
| Temperature [° C.] | HFE-356mmz | HFIP |
| −20 | ○ | ○ |
| 0 | ○ | ○ |
| 20 | ○ | ○ |
| 40 | ○ | ○ |
| 60 | ○ | ○ |
| 80 | ○ | ○ |

TABLE 19

| Refrigerating machine oil: Polyvinylether oil (Daphne Hermetic Oil FVC68D) | | |
| --- | --- | --- |
| 温度 [° C.] | HFE-356mmz | HFIP |
| −20 | ○ | ○ |
| 0 | ○ | ○ |
| 20 | ○ | ○ |
| 40 | ○ | ○ |
| 60 | ○ | ○ |
| 80 | ○ | ○ |

Both of 1,1,1,3,3,3-hexafluoroisopropylmethylether and hexafluoroisopropanol exhibited good compatibility with polyolester oil, polyalkyleneglycol oil and polyvinylether oil, which were synthetic oils.

<Cleaning Test>

In an example according to the present invention, a cleaning test was performed on a cleaner containing 1,1,1,3,3,3-hexafluoroisopropylmethylether and hexafluoroisopropanol as follows.

A SUS metal net (weight: Ag) was immersed in each of various specimen oils for 30 seconds and left at room temperature for 1 hour to remove an excessive portion of oil. Then, the weight of each metal net having the oil attached thereto was measured (weight: Bg). After this, each metal net was immersed in 80 ml of cleaner (in a beaker in an ultrasonic water tank) kept at a predetermined temperature (20.0° C.) for 30 seconds to remove the oil, was dried at 70° C. for 2 hours, and was left at room temperature for 1 hour to be cooled. The weight of each metal net after the oil was removed was measured (weight: Cg). The oil removing ratio was obtained by the following expression.

$$\text{Oil removing ratio (\% by weight)} = ((Bg-Cg)/(Bg-Ag)) \times 100$$

Example 9

In example 9, a cleaner containing 90% by mass of 1,1,1,3,3,3-hexafluoroisopropylmethylether and 10% by mass of hexafluoroisopropanol was evaluated by the above-described test method by use of Ze-GLES RB68 produced by JX Nippon Oil & Energy Corporation as specimen oil.

Comparative Example 4

In comparative example 4, 1,1,1,3,3,3-hexafluoroisopropylmethylether was evaluated by the above-described test method by use of Ze-GLES RB68 produced by JX Nippon Oil & Energy Corporation as specimen oil.

Comparative Example 5

In comparative example 5, hexafluoroisopropanol was evaluated by the above-described test method by use of Ze-GLES RB68 produced by JX Nippon Oil & Energy Corporation as specimen oil.

Comparative Example 6

In comparative example 6, 1,1,2,2-tetrafluoroethyl-2,2,2-trifluoroethylether was evaluated by the above-described test method by use of Ze-GLES RB68 produced by JX Nippon Oil & Energy Corporation as specimen oil.

Table 20 shows the evaluation results.

TABLE 20

| | Ze-GLES RB68 by JX Nippon Oil & Energy | | | | | |
|---|---|---|---|---|---|---|
| Cleaner | Immersion-in-oil time (sec) | Leaving-at-room-temperature time (h) | Cleaning time (sec) | Drying time (h) | Cooling time (h) | Oil removing ratio (wt %) |
| 356mmz/HFIP = 90:10 (mass ratio) | 30 | 1 | 30 | 2 | 1 | 100 |
| 356mmz | 30 | 1 | 30 | 2 | 1 | 100 |
| HFIP | 30 | 1 | 30 | 2 | 1 | 100 |
| AE-3000 | 30 | 1 | 30 | 2 | 1 | 100 |

As shown in Table 20, the cleaner according to the present invention exhibited a cleaning power equivalent to those of the comparative examples to Ze-GLES RB68 produced by JX Nippon Oil & Energy Corporation. The cleaner according to the present invention was shown to be an excellent cleaner with a significantly lower global warming potential and much less environmental load than those of hexafluoroisopropanol (HFIP) in comparative example 5 and 1,1,2,2-tetrafluoroethyl-2,2,2-trifluoroethylether (AE-3000) in comparative example 6.

Example 10

In example 10, a cleaner containing 35% by mass of 1,1,1,3,3,3-hexafluoroisopropylmethylether and 65% by mass of hexafluoroisopropanol was evaluated by the above-described test method by use of alkylbenzene oil (ATMOS 68N) as specimen oil.

Example 11

In example 11, a cleaner containing 90% by mass of 1,1,1,3,3,3-hexafluoroisopropylmethylether and 10% by mass of hexafluoroisopropanol was evaluated by the above-described test method by use of alkylbenzene oil (ATMOS 68N) as specimen oil.

Comparative Example 7

In comparative example 7, 1,1,1,3,3,3-hexafluoroisopropylmethylether was evaluated by the above-described test method by use of alkylbenzene oil (ATMOS 68N) as specimen oil.

Comparative Example 8

In comparative example 8, hexafluoroisopropanol was evaluated by the above-described test method by use of alkylbenzene oil (ATMOS 68N) as specimen oil.

Comparative Example 9

In comparative example 9, 1,1,2,2-tetrafluoroethyl-2,2,2-trifluoroethylether was evaluated by the above-described test method by use of alkylbenzene oil (ATMOS 68N) as specimen oil.

Table 21 shows the evaluation results.

TABLE 21

| | Alkylbenzene oil (ATMOS 68N) | | | | | |
|---|---|---|---|---|---|---|
| Cleaner | Immersion-in-oil time (sec) | Leaving-at-room-temperature time (h) | Cleaning time (sec) | Drying time (h) | Cooling time (h) | Oil removing ratio (wt %) |
| 356mmz/HFIP = 35:65 (mass ratio) | 30 | 1 | 30 | 2 | 1 | 43 |
| 356mmz/HFIP = 90:10 (mass ratio) | 30 | 1 | 30 | 2 | 1 | 42 |
| 356mmz | 30 | 1 | 30 | 2 | 1 | 39 |
| HFIP | 30 | 1 | 30 | 2 | 1 | 39 |
| AE-3000 | 30 | 1 | 30 | 2 | 1 | 28 |

A shown in Table 21, the cleaners according to the present invention each showed a cleaning power higher than those of the comparative examples to the alkylbenzene oil (ATMOS 68N). The cleaners according to the present invention each showed a cleaning effect higher than those of 1,1,1,3,3,3-hexafluoroisopropylmethylether (356mmz) used independently in comparative example 7 and hexafluoroisopropanol (HFIP) used independently in comparative example 8. As can be seen from the results in examples 10 and 11, as the content of hexafluoroisopropanol was higher, the cleaning power was higher. The cleaners according to the present invention are each an excellent cleaner with a significantly lower global warming potential and much less environmental load than those of hexafluoroisopropanol (HFIP) in comparative example 8 and 1,1,2,2-tetrafluoroethyl-2,2,2-trifluoroethylether (AE-3000) in comparative example 9.

Cleaning tests for polyalkyleneglycol oil (SUNICE P56) and polyvinylether oil (Daphne Hermetic Oil FVC68D) were performed in substantially the same manner. Table 22 shows the results.

TABLE 22

| Cleaner | Cleaning time (sec) | Polyolester oil (Ze-GLES RB68) | Polyalkyleneglycol (SUNICE P56) | Polyvinylether oil (Daphne Hermetic Oil FVC68D) | Alkylbenzene oil (ATMOS 68N) |
|---|---|---|---|---|---|
| 356mmz/HFIP = 35/65 | 30 | ○ | ○ | ○ | Δ |
| 356mmz/HFIP = 90/10 | 30 | ○ | ○ | ○ | Δ |
| 356mmz | 30 | ○ | ○ | ○ | Δ |
| HFIP | 30 | ○ | ○ | ○ | Δ |
| AE-3000 | 30 | ○ | ○ | ○ | X |

Evaluation of removing ratio:
○: 80 to 100 wt %;
Δ: 30 to 80 wt %;
X: 0 to 30 wt %

As is clear from the results shown in Table 22, the cleaners according to the present invention each showed a cleaning power equivalent to those of the comparative examples to each of the various types of specimen oil. The cleaners according to the present invention are each an excellent cleaner with a significantly lower global warming potential and much less environmental load than those of hexafluoroisopropanol (HFIP) and 1,1,2,2-tetrafluoroethyl-2,2,2-trifluoroethylether (AE-3000).

The present invention provides an azeotropic mixture-like composition that is non-flammable or low flammable, has little influence on the environment, and has substantially the same mixture ratio in a liquid phase portion and a vapor phase portion. Provided by use of the azeotropic mixture-like composition according to the present invention are a heat transfer composition and a cleaner each of which is non-flammable or low flammable, has little influence on the environment, and has substantially the same mixture ratio in a liquid phase portion and a vapor phase portion. Also provided by use of the azeotropic mixture-like composition according to the present invention are a high-temperature heat pump device that has little influence on the environment and has substantially the same mixture ratio in a liquid phase portion and a vapor phase portion, and a heat transfer method using such a high-temperature heat pump device.

The present invention relates to an azeotropic mixture-like composition containing 1,1,1,3,3,3-hexafluoroisopropylmethylether and hexafluoroisopropanol that is useful in various applications. Provided by use of the azeotropic mixture-like composition according to the present invention are a heat transfer composition and a cleaner each of which is non-flammable or low flammable, has little influence on the environment, and has substantially the same mixture ratio in a liquid phase portion and a vapor phase portion. Also provided by use of the azeotropic mixture-like composition according to the present invention are a high-temperature heat pump device that has little influence on the environment and has substantially the same mixture ratio in a liquid phase portion and a vapor phase portion, and a heat transfer method using such a high-temperature heat pump device. Use of the composition according to the present invention for a heat transfer composition usable in a high-temperature heat pump allows middle-to-low-temperature warm water, which has not been fully utilized so far, to be heated and used as high quality warm water, pressurized hot water or superheated vapor.

The invention claimed is:

1. An azeotropic-like mixture composition comprising 1,1,1,3,3,3-hexafluoroisopropylmethylether and hexafluoroisopropanol, wherein 1,1,1,3,3,3,-hexafluoroisopropylmethylether is contained at a ratio higher than or equal to 90% by mass and lower than or equal to 99.9% by mass.

2. An azeotropic-like mixture heat transfer composition comprising 1,1,1,3,3,3-hexafluoroisopropylmethylether and hexafluoroisopropanol, wherein 1,1,1,3,3,3-hexafluoroisopropylmethylether is present in the composition at a ratio higher than or equal to 33.0% by mass and lower than or equal to 99.9% by mass.

3. The heat transfer composition according to claim 2, wherein 1,1,1,3,3,3-hexafluoroisopropylmethylether is present in the composition at a ratio higher than or equal to 90% by mass and lower than or equal to 99.9% by mass.

4. The heat transfer composition according to claim 2, further comprising:
a lubricant;
wherein the lubricant is a synthetic oil selected from the group consisting of mineral oil (paraffin-based oil or naphthene-based oil), any of alkylbenzenes (ABs), poly (alpha-olefin), esters, polyolesters (POEs), polyalkyleneglycols (PAGs), polyvinylethers (PVEs), and a combination thereof.

5. The heat transfer composition according to claim 2, further comprising:
a stabilizer;
wherein the stabilizer is selected from the group consisting of nitro compounds, epoxy compounds, phenols, imidazoles, amines, diene-based compounds, phosphates, aromatic unsaturated hydrocarbons, isoprenes, propadienes, terpenes, and a combination thereof.

6. The heat transfer composition according to claim 2, further comprising:
a flame retardant;
wherein the flame retardant is selected from the group consisting of phosphates, halogenated aromatic compounds, fluorinated iodocarbon, fluorinated bromocarbon, and a combination thereof.

7. A cleaner comprising the composition according to claim 1.

8. The cleaner according to claim 7, further comprising a non-ionic surfactant at a ratio higher than or equal to 0.1% by mass and lower than or equal to 20% by mass.

9. A heat transfer method using a high-temperature heat pump device accommodating a heat transfer composition, the method comprising the steps, performed sequentially, of:
 evaporating the heat transfer composition in an evaporator;
 compressing the heat transfer composition in a compressor;
 condensing the heat transfer composition in a condenser; and
 reducing the pressure of the heat transfer composition in an expansion valve;
 wherein the heat transfer composition comprises 1,1,1,3,3,3-hexafluoroisopropylmethylether and hexafluoroisopropanol, and has a condensation temperature higher than or equal to 70° C.

10. The heat transfer method according to claim 9, wherein 1,1,1,3,3,3-hexafluoroisopropylmethylether is present in the composition at a ratio higher than or equal to 33.0% by mass and lower than or equal to 99.9% by mass.

11. The heat transfer method according to claim 9, wherein 1,1,1,3,3,3-hexafluoroisopropylmethylether is present in the composition at a ratio higher than or equal to 90% by mass and lower than or equal to 99.9% by mass.

12. The heat transfer method according to claim 9, further comprising:
 a lubricant;
 wherein the lubricant is a synthetic oil selected from the group consisting of mineral oil (paraffin-based oil or naphthene-based oil), any of alkylbenzenes (ABs), poly(alpha-olefin), esters, polyolesters (POEs), polyalkyleneglycols (PAGs), polyvinylethers (PVEs), and a combination thereof.

13. The heat transfer method according to claim 9, further comprising:
 a stabilizer;
 wherein the stabilizer is selected from the group consisting of nitro compounds, epoxy compounds, phenols, imidazoles, amines, diene-based compounds, phosphates, aromatic unsaturated hydrocarbons, isoprenes, propadienes, terpenes, and a combination thereof.

14. The heat transfer method according to claim 9, further comprising:
 a flame retardant;
 wherein the flame retardant is selected from the group consisting of phosphates, halogenated aromatic compounds, fluorinated iodocarbon, fluorinated bromocarbon, and a combination thereof.

15. The heat transfer method according to claim 9, wherein warm water, pressurized warm water or superheated vapor having a temperature higher than or equal to 60° C. is generated.

16. A high-temperature heat pump device using the heat transfer method according to claim 9.

* * * * *